United States Patent
Lee et al.

(10) Patent No.: US 11,294,423 B2
(45) Date of Patent: Apr. 5, 2022

(54) DISPLAY DEVICE

(71) Applicant: Samsung Display Co., LTD., Yongin-si (KR)

(72) Inventors: Jeong Heon Lee, Hwaseong-si (KR); Young Sik Kim, Yongin-si (KR); Jong Tae Kim, Seoul (KR); Sang Wook Yoo, Hwaseong-si (KR); Si Young Choi, Asan-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/811,442

(22) Filed: Mar. 6, 2020

(65) Prior Publication Data
US 2021/0011510 A1   Jan. 14, 2021

(30) Foreign Application Priority Data
Jul. 10, 2019  (KR) .................. 10-2019-0083461

(51) Int. Cl.
  *G06F 1/16*   (2006.01)
  *G06F 3/16*   (2006.01)
  *G10K 9/122*  (2006.01)

(52) U.S. Cl.
  CPC .......... *G06F 1/1605* (2013.01); *G06F 1/1626* (2013.01); *G06F 1/1652* (2013.01); *G06F 3/16* (2013.01); *G10K 9/122* (2013.01)

(58) Field of Classification Search
  CPC .... G06F 1/1605; G06F 1/1626; G06F 1/1652; G06F 3/16; G10K 9/122
  See application file for complete search history.

(56) References Cited

U.S. PATENT DOCUMENTS

| 2013/0271418 | A1* | 10/2013 | Ishii ........................ G06F 3/016 345/173 |
| 2014/0306914 | A1* | 10/2014 | Kagayama .......... G06F 3/03547 345/173 |
| 2017/0280216 | A1 | 9/2017 | Lee et al. |
| 2018/0019805 | A1 | 1/2018 | Park |
| 2018/0269808 | A1 | 9/2018 | Park et al. |
| 2018/0326456 | A1* | 11/2018 | Park ........................ G01L 1/146 |
| 2019/0014402 | A1 | 1/2019 | Ahn et al. |

FOREIGN PATENT DOCUMENTS

KR    10-2019-0006113    1/2019

\* cited by examiner

*Primary Examiner* — Daryl C Pope
(74) *Attorney, Agent, or Firm* — H.C. Park & Associates, PLC

(57) ABSTRACT

A display device may include: a display panel; a vibration generating device disposed on one surface of the display panel, the vibration generating device configured to generate vibration to be transmitted to the display panel; a panel bottom member disposed between the display panel and the vibration generating device; and a vibration transmitting member disposed in the panel bottom member to at least partially overlap with the vibration generating device in plan view.

19 Claims, 30 Drawing Sheets

DISPLAY DEVICE

CROSS REFERENCE TO RELATED APPLICATION

This application claims priority from and the benefit of Korean Patent Application No. 10-2019-0083461, filed on Jul. 10, 2019, which is hereby incorporated by reference for all purposes as if fully set forth herein.

BACKGROUND

Field

Exemplary embodiments/implementations of the invention relate generally to a display device.

Discussion of the Background

As the information society has developed, the demand for display devices for displaying images has increased and diversified. For example, display devices have been applied to a variety of electronic devices such as a smartphone, a digital camera, a notebook computer, a navigation device, a smart television (TV), and the like. A typical display device may include a display panel for displaying an image and a sound generating device for providing sound.

As the application of display devices has diversified, the demand for display devices in various designs has increased. For a smartphone, for example, there is a need for a widened display area for a display device, with removal of a sound generating device such as a speaker for outputting voices in a call mode.

The above information disclosed in this Background section is only for understanding of the background of the inventive concepts, and, therefore, it may contain information that does not constitute prior art.

SUMMARY

Devices constructed according to exemplary embodiments of the invention may provide a display device capable of outputting sound using a sound generating device that is not exposed to the outside.

Devices constructed according to exemplary embodiments of the invention may also provide a display device capable of raising the sound pressure of a sound generating device that is not exposed to the outside.

Additional features of the inventive concepts will be set forth in the description which follows, and in part will be apparent from the description, or may be learned by practice of the inventive concepts.

According to one or more exemplary embodiments, a display device may include: a display panel; a vibration generating device disposed on one surface of the display panel, the vibration generating device configured to generate vibration to be transmitted to the display panel; a panel bottom member disposed between the display panel and the vibration generating device; and a vibration transmitting member disposed in the panel bottom member to at least partially overlap with the vibration generating device in plan view.

At least some of the vibration generated by the vibration generating device may be transmitted to the display panel via the vibration transmitting member.

The vibration transmitting member may include a metallic material.

The vibration generating device may include: a first electrode configured to receive a first driving voltage; a second electrode configured to receive a second driving voltage; and a first vibration layer disposed between the first and second electrodes, the first vibration layer may be configured to contract and expand in accordance with the first and second driving voltages.

The display device may further include: a first adhesive member disposed between the display panel and the panel bottom member, the panel bottom member may include: a buffer member disposed on one surface of the first adhesive member; a film layer disposed on one surface of the buffer member; a shielding member disposed on one surface of the film layer;

and a heat dissipation member disposed on one surface of the shielding member.

The panel bottom member may include a hole defining an empty space in at least portion of the shielding member, the hole being disposed overlapping with the vibration transmitting member in plan view.

The vibration transmitting member may be disposed in the hole, and the vibration generating device may be disposed below the heat dissipation member.

The vibration transmitting member may have a thickness of 25 µm to 50 µm.

The vibration transmitting member may be disposed below the heat dissipation member to overlap with the hole in plan view, and the vibration generating device may be disposed below the vibration transmitting member.

The panel bottom member may include an opening which exposes at least part of the film layer, and the vibration transmitting member may be disposed on the exposed part of the film layer.

The display device may further include: a second adhesive member disposed between the vibration transmitting member and the film layer; and a third adhesive member disposed between the vibration generating device and the vibration transmitting member.

According to one or more exemplary embodiments, a display device may include: a display panel; a panel bottom member disposed below the display panel; a first vibration generating device disposed below the panel bottom member, the vibration generating device configured to generate vibration in response to receiving driving voltages; a display circuit board disposed below the panel bottom member; and a flexible printed circuit board electrically connecting the first vibration generating device and the display circuit board, the panel bottom member may include a first vibration transmitting member configured to transmit the vibration to the display panel, the first vibration transmitting member disposed to at least partially overlap with the first vibration generating device in plan view.

A width of the first vibration transmitting member in a first direction may be greater than a width of the first vibration generating device in the first direction, and a length of the first vibration transmitting member in a second direction that intersects the first direction may be greater than a length of the first vibration generating device in the second direction.

The first vibration transmitting member may include: a body portion disposed to overlap with the first vibration generating device in plan view; stem portions connected to the body portion and extending in the first direction not to overlap with the first vibration generating device in plan view; and branch portions branching off in the second direction from the stem portions.

The first vibration transmitting member may have a mesh structure.

The display circuit board may include a sound driving unit configured to output first and second driving voltages to the first vibration generating device, and the first vibration generating device may include a vibration layer configured to contract and expand in accordance with the first and second driving voltages.

The display device may further include a second vibration generating device disposed below the panel bottom member to be spaced apart from the first vibration generating device, the panel bottom member may further include a second vibration transmitting member disposed to overlap with the second vibration generating device in plan view.

The first vibration generating device may be disposed closer than the second vibration generating device to a first side of the display panel, the second vibration generating device may be disposed closer than the first vibration generating device to a second side of the display panel, and the second side of the display panel may be opposite to the first side of the display panel.

The display device may further include: a blocking member disposed between the first and second vibration transmitting members distanced apart from the first and second vibration transmitting members, the blocking member configured to block vibration transmitted from the first and second vibration transmitting members.

According to one or more exemplary embodiments, a display device may include: a display panel; an adhesive member disposed below the display panel; a panel bottom member disposed below the adhesive member; a vibration generating device disposed below the panel bottom member, the vibration generating device configured to: receive driving voltages; and generate vibration in response to the received driving voltages; and a vibration transmitting member disposed between the vibration generating device and the display panel, the vibration transmitting member may be disposed on at least a part of the adhesive member exposed by an opening formed in the panel bottom member.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
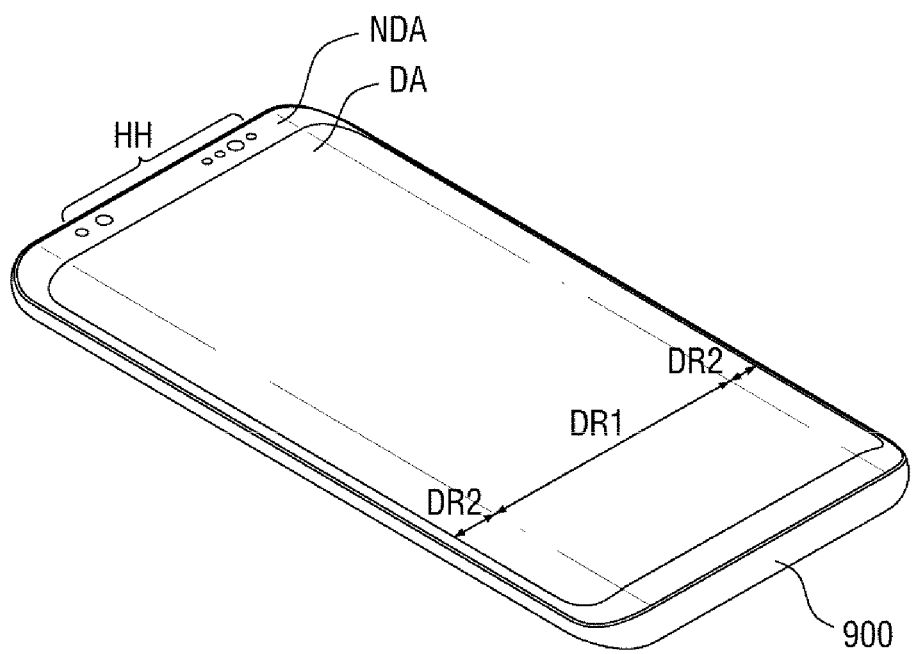
FIG. 1 is a perspective view of a display device according to an exemplary embodiment of the present disclosure.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the X-axis, the Y-axis, and the Z-axis are not limited to three axes of a rectangular coordinate system, such as the x, y, and z-axes, and may be interpreted in a broader sense. For example, the X-axis, the Y-axis, and the Z-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As is customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Hereinafter, embodiments will be described with reference to the attached drawings.

FIG. 1 is a perspective view of a display device according to an exemplary embodiment of the present disclosure.

Referring to FIG. 1, a display device 10 may be applied to a mid- or small-size electronic device such as a tablet personal computer (PC), a smartphone, an automobile navigation device, a camera, a center information display (CID) provided in an automobile, a wristwatch-type electronic device, a personal digital assistant (PDA), a portable multimedia player (PMP), or a gaming console or to a mid- or large-size electronic device such as a television (TV), an outdoor billboard, a monitor, a PC, or a notebook computer, but the present disclosure is not limited thereto. That is, the display device 10 may be applied to various electronic devices other than those set forth herein without departing from the inventive concepts of the present disclosure.

Figure 2:
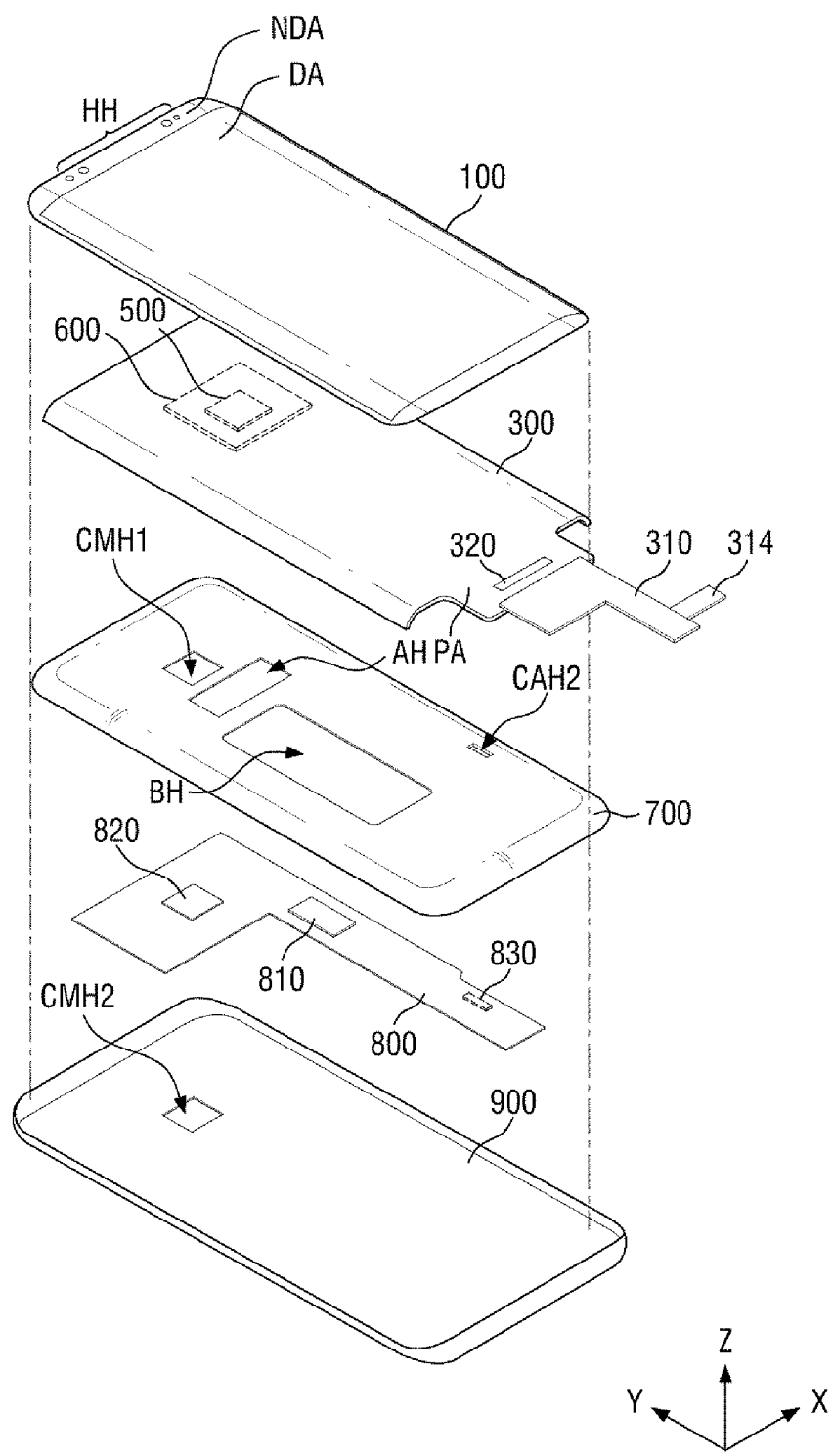
FIG. 2 is an exploded perspective view of the display device of FIG. 1.
Figure 3:
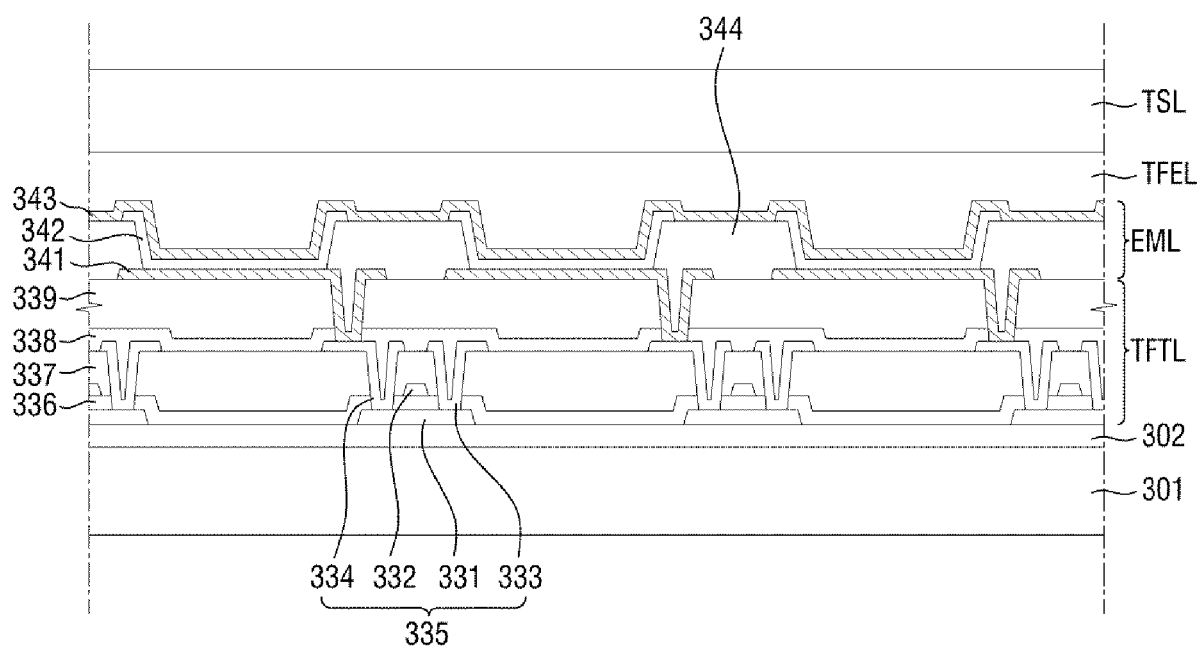
FIG. 3 is a cross-sectional view illustrating a display area of a display panel of the display device of FIG. 1.
Figure 4:
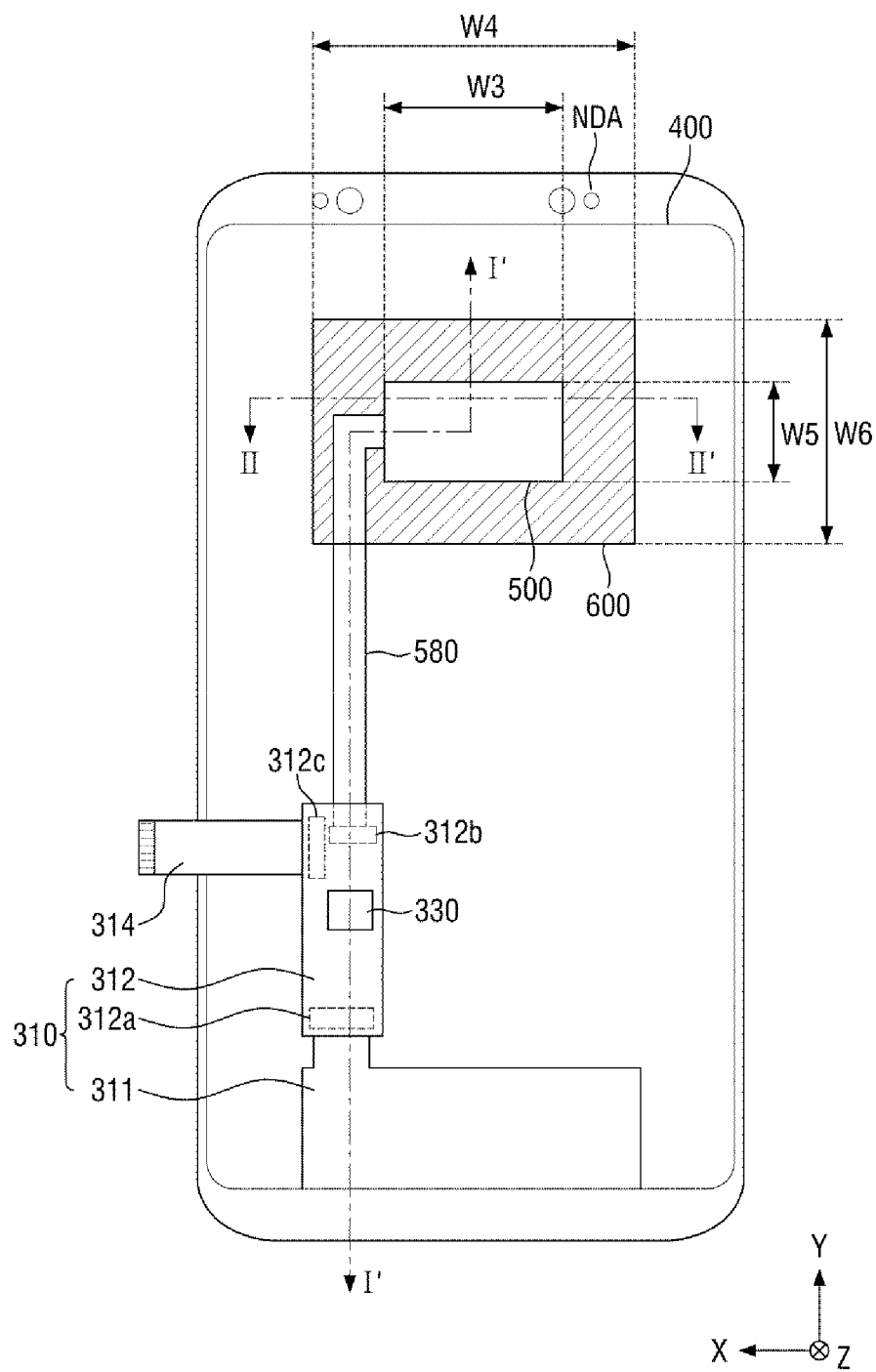
FIG. 4 is a bottom view illustrating how a display panel is attached to a cover window of FIG. 2.
Figure 5:
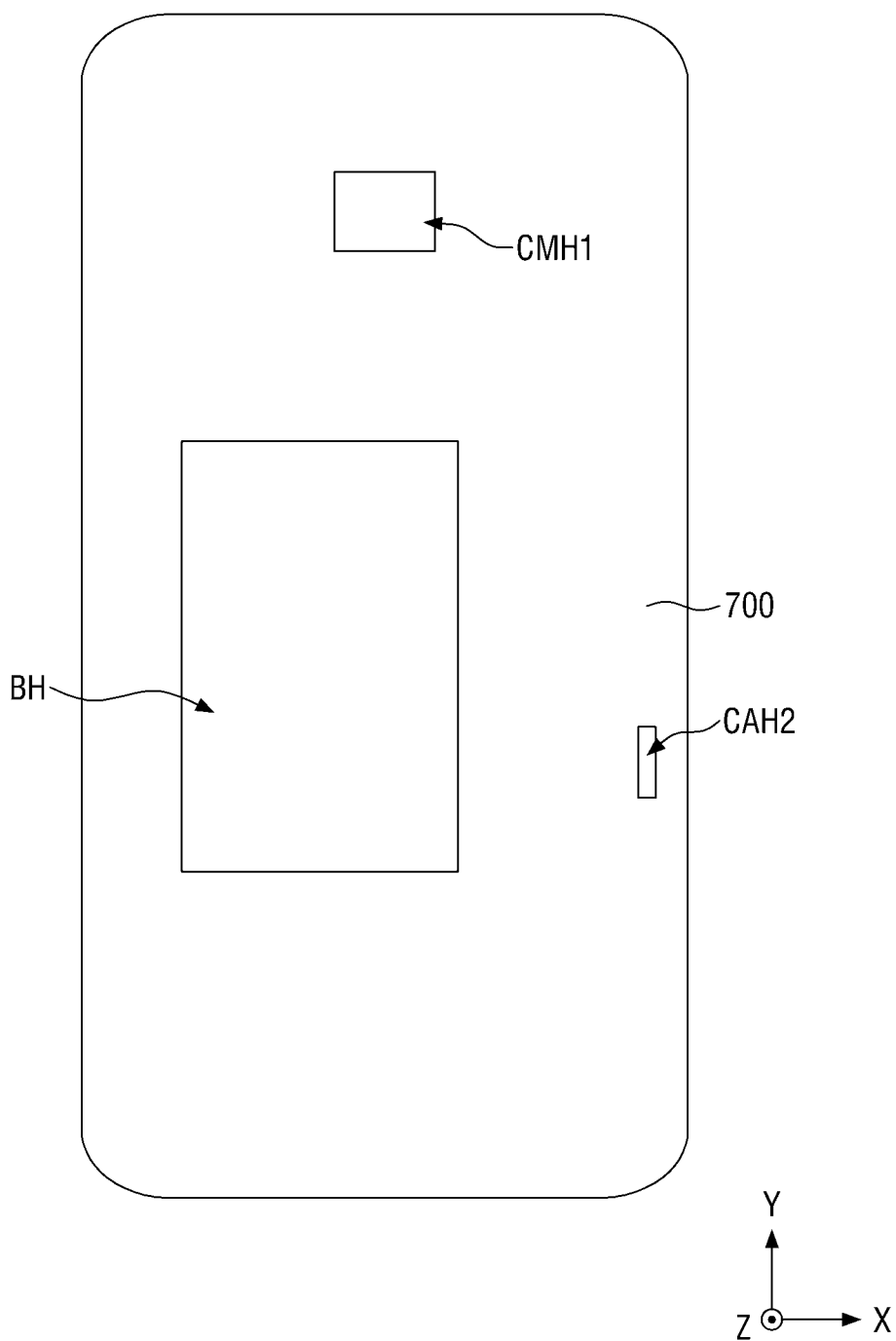
FIG. 5 is a plan view illustrating a middle frame of FIG. 2.
Figure 6:
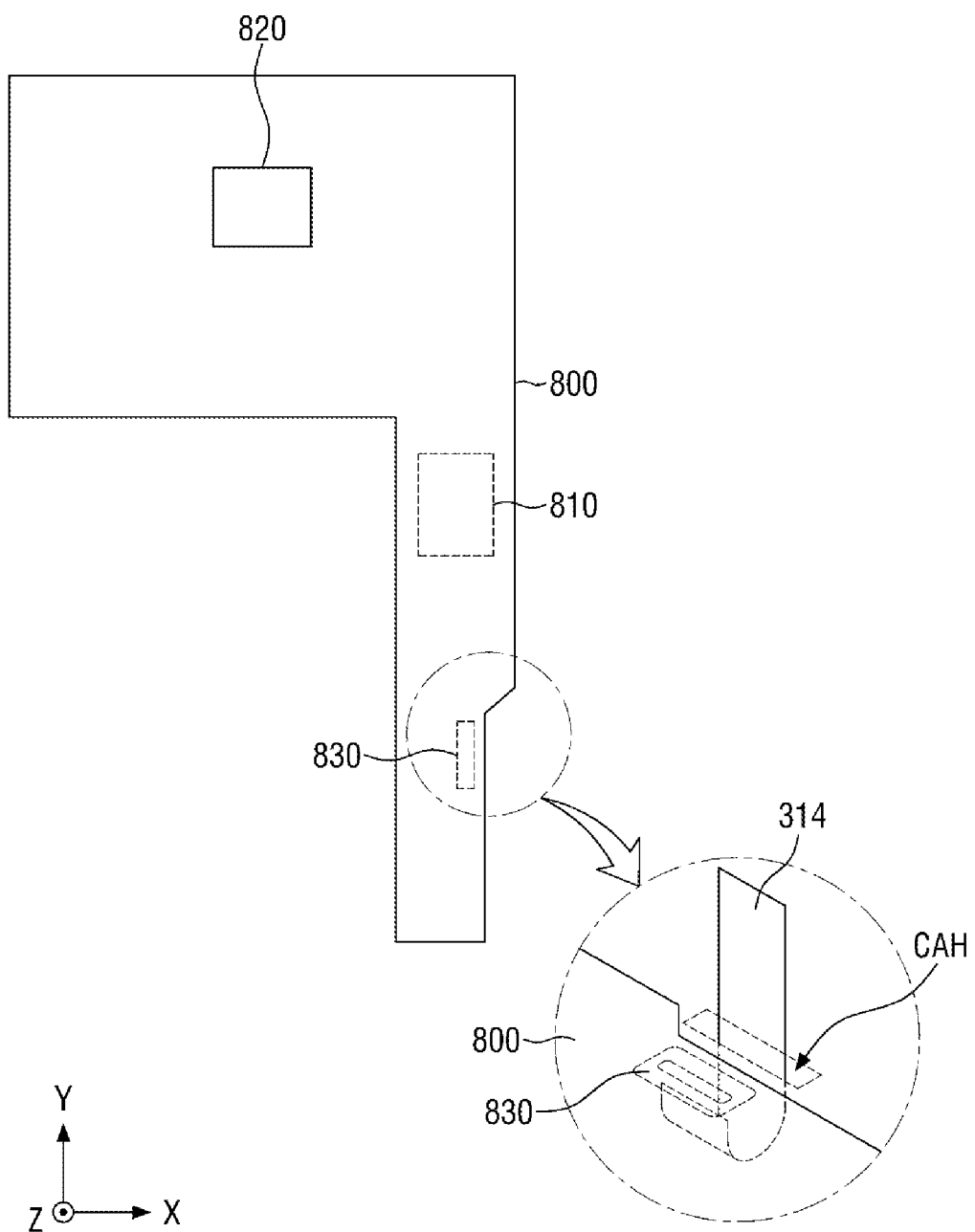
FIG. 6 is a plan view illustrating a main circuit board of FIG. 2.
Figure 7A:
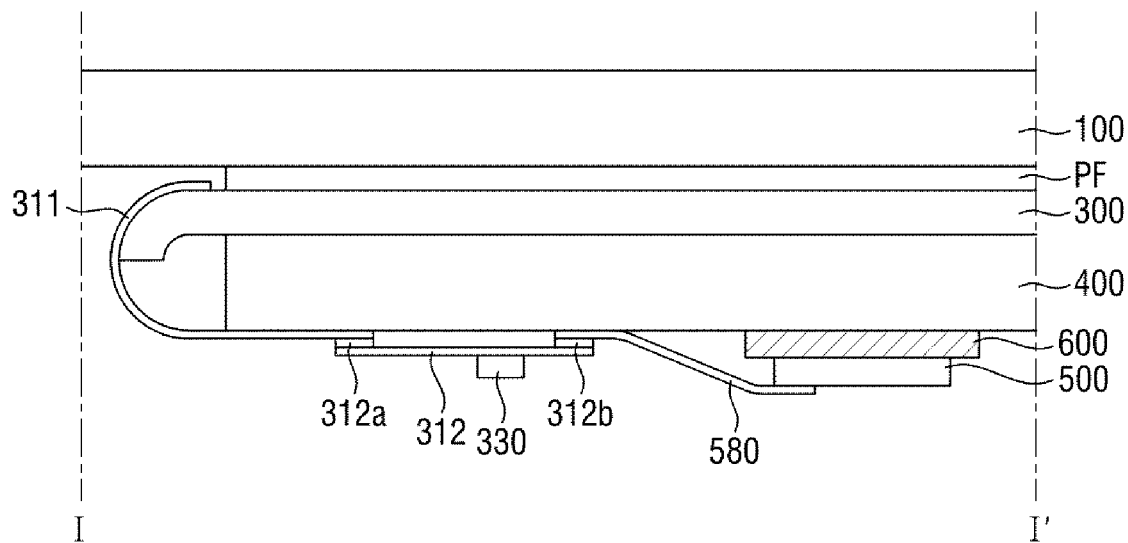
FIG. 7A is a cross-sectional view taken along line I-I' of FIG. 4.
Figure 7A:
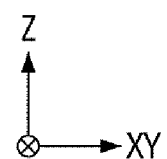
Figure 7B:
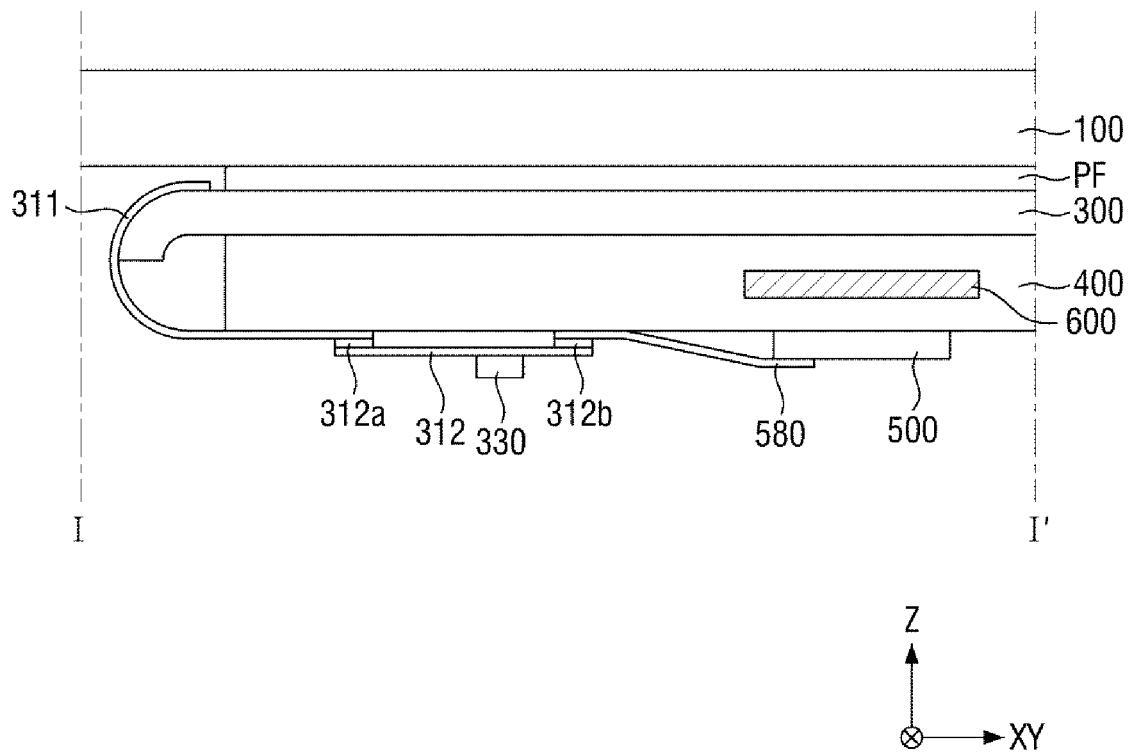
FIG. 7B is a cross-sectional view taken along line I-I' of FIG. 4.

FIG. 2 is an exploded perspective view of the display device of FIG. 1. FIG. 3 is a cross-sectional view illustrating a display area of a display panel of the display device of FIG. 1. FIG. 4 is a bottom view illustrating how a display panel is attached to a cover window of FIG. 2. FIG. 5 is a plan view illustrating a middle frame of FIG. 2. FIG. 6 is a plan view illustrating a main circuit board of FIG. 2. FIGS. 7A and 7B are cross-sectional views taken along line I-I' of FIG. 4.

Referring to FIGS. 1, 2, 3, 4, 5, 6, and 7A, the display device 10 includes a cover window 100, a display panel 300, a display circuit board 310, a display driving unit 320, a panel bottom member 400, a vibration generating device 500, a vibration transmitting member 600, a middle frame 700, a main circuit board 800, and a lower cover 900.

The display device 10 may have a rectangular shape in a plan view. For example, as illustrated in FIG. 1, the display device 10 may be in the shape of a rectangle having a pair of short sides extending in a first direction (or an X-axis direction) and a pair of long sides extending in a second direction (or a Y-axis direction). The corners at which the long sides and the short sides meet may be rounded to have a predetermined curvature or may be right-angled. The planar shape of the display device 10 is not particularly limited to a rectangular shape, and the display device 10 may be formed into various other shapes such as another polygonal shape, a circular shape, or an elliptical shape.

The display device 10 may include a first region DR1 which is flat and second regions DR2 which extend from the left and right sides of the first region DR1. The second regions DR2 may be flat or curved. In a case where the second regions DR2 are flat, the angle that the first region DR1 and the second regions DR2 form may be an obtuse angle. In a case where the second regions DR2 are curved, the second regions DR2 may have a uniform or variable curvature.

FIG. 1 illustrates that the second regions DR2 extend from the left and right sides of the first region DR1, but the present disclosure is not limited thereto. Alternatively, the second regions DR2 may extend from only one of the left and right sides of the first region DR1. Yet alternatively, the second regions DR2 may extend from at least one of the upper and lower sides of the first region DR1. The second regions DR2 will hereinafter be described as being disposed on the left and right sides of the first region DR1.

The cover window 100 may be disposed on the display panel 300 to cover the top surface of the display panel 300. Accordingly, the cover window 100 may protect the top surface of the display panel 300. The cover window 100 may be attached to the top surface of the display panel 300 via an adhesive member. The cover window 100 may be formed of glass, sapphire, and/or plastic. The cover window 100 may be formed to be rigid or flexible. The adhesive member may be an optically clear adhesive (OCA) or an optically clear resin (OCR).

The cover window 100 may include a light-transmitting area DA which corresponds to the display panel 300 and a light-blocking area NDA which corresponds to an area other than the display panel 300. The cover window 100 may be disposed in the first region DR1 and in the second regions DR2. The light-transmitting area DA may be disposed in portion in the first region DR1 and in portion in the second regions DR2. The light-transmitting area NDA may be formed to be opaque. In a case where the light-blocking area NDA does not display an image, the light-blocking area NDA may be formed as a decorative layer that can be seen by a user. For example, a company's logo or a string of various characters or letters may be patterned into the light-blocking area NDA. Also, holes HH, which are for exposing a front camera, a front speaker, an iris recognition sensor, and an illumination sensor, may be formed in the light-blocking area NDA, but the present disclosure is not limited thereto. For example, some or all of the front camera, the front speaker, the iris recognition sensor, and the illumination sensor may be embedded in the display panel 300, in which case, some or all of the holes HH may not be provided.

The display panel 300 may be disposed below the cover window 100. The display panel 300 may be disposed to overlap with the light-transmitting area DA of the cover window 100. The display panel 300 may be disposed in the first region DR1 and in the second regions DR2. As a result, an image from the display panel 300 can be seen not only in the first region DR1, but also in the second regions DR2.

Figure 8:
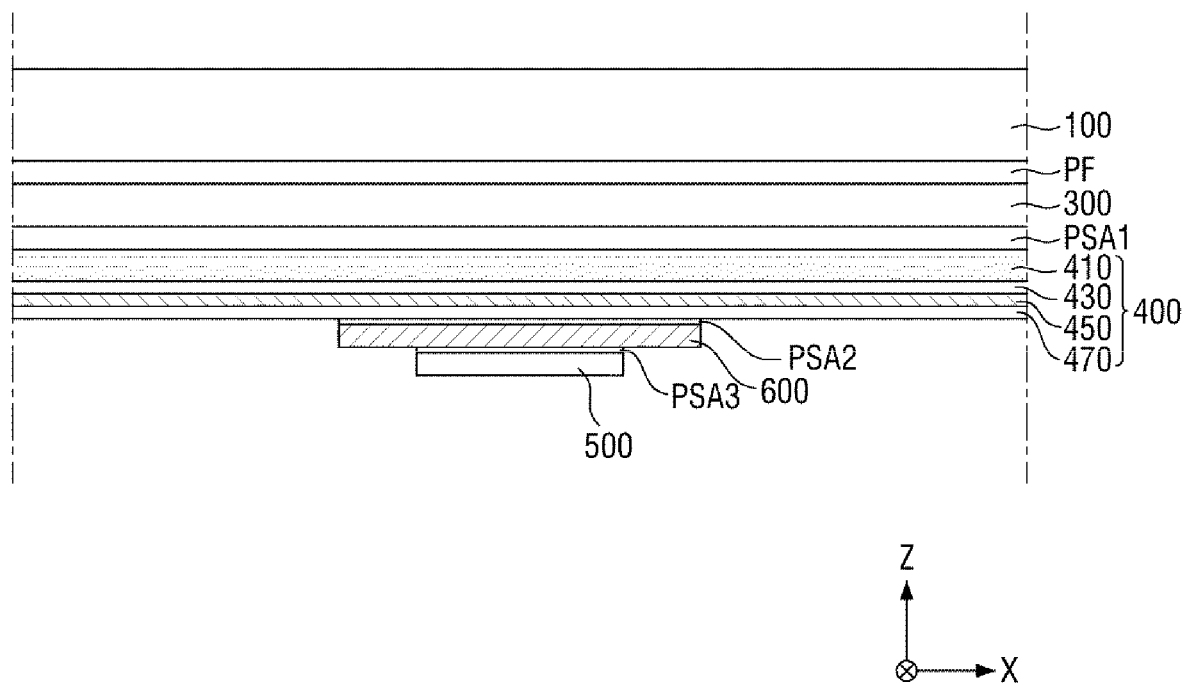
FIG. 8 is a cross-sectional view taken along line II-IF of FIG. 4.

A polarizing film PF, which is for preventing or reducing visibility degradation that may be caused by the reflection of external light, may be attached between the display panel 300 and the cover window 100, as illustrated in FIG. 8. The polarizing film PF may include at least one of a half-wave ($\lambda/2$) plate or a quarter-wave ($\lambda/4$) plate.

The display panel 300 may be a light-emitting display panel including light-emitting elements. For example, the display panel 300 may be an organic light-emitting diode (OLED) display panel using OLEDs, a micro-light-emitting diode (mLED) display panel using mLEDs, or a quantum-dot light-emitting diode (QLED) display panel using QLEDs. The display panel 300 will hereinafter be described as being an OLED display panel.

Referring to FIG. 3, the display panel 300 may include a first substrate 301, a pixel array layer which includes a thin-film transistor (TFT) layer TFTL, a light-emitting element layer EML, and a thin-film encapsulation layer TFEL that are disposed on the first substrate 301, and a touch sensor layer TSL which is disposed on the thin-film encapsulation layer TFEL. A display area of the display panel 300 refers to an area where the light-emitting element layer EML is formed to display an image, and a non-display area of the display panel 300 refers to an area on the periphery of the display area.

The first substrate 301 may be a rigid substrate or a flexible substrate that is bendable, foldable, or rollable. The first substrate 301 may be formed of an insulating material such as glass, quartz, or a polymer resin. Examples of the polymer resin include polyethersulphone (PES), polyacrylate (PA), polyarylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate (CAT), cellulose acetate propionate (CAP), and a combination thereof. The first substrate 301 may include a metallic material.

The TFT layer TFTL is formed on the first substrate 301. The TFT layer TFTL includes TFTs 335, a gate insulating film 336, an interlayer insulating film 337, a passivation film 338, and a planarization film 339.

A buffer film 302 may be formed on the first surface of the first substrate 301 that faces the second substrate 112. The buffer film 302 may be formed on the first substrate 301 to protect the TFTs 335 and the light-emitting elements against moisture that may penetrate the first substrate 301, which is susceptible to moisture. The buffer film 302 may consist of a plurality of inorganic films that are alternately stacked. For example, the buffer film 302 may be formed as a multilayer film in which at least one inorganic film selected from among a silicon oxide (SiOx) film, a silicon nitride (SiNx) film, and a silicon oxynitride (SiON) film is alternately stacked. The buffer film 302 may not be provided.

The TFTs 335 are formed on the buffer film 302. Each of the TFTs 335 includes an active layer 331, a gate electrode 332, a source electrode 333, and a drain electrode 334. FIG. 3 illustrates that the TFTs 335 have a top gate structure in which the gate electrode 332 is disposed above the active layer 331, but the present disclosure is not limited thereto. That is, the TFTs 335 may have a bottom gate structure in which the gate electrode 332 is disposed below the active layer 331 or a double gate structure in which the gate electrode 332 is disposed both above and below the active layer 331.

The active layer 331 is formed on the buffer film 302. The active layer 331 may be formed of a silicon-based semiconductor material or an oxide-based semiconductor material. A light-shielding layer for blocking external light incident on the active layer 331 may be formed between the buffer film 302 and the active layer 331.

The gate insulating film 336 may be formed on the active layer 331. The gate insulating film 336 may be formed as an inorganic film such as, for example, a silicon oxide film, a silicon nitride film, or a multilayer film thereof.

The gate electrode 332 and a gate line may be formed on the gate insulating film 336. The gate electrode 332 and the gate line may be formed as single- or multilayer films using molybdenum (Mo), aluminum (Al), chromium (Cr), gold (Au), titanium (Ti), nickel (Ni), neodymium (Nd), copper (Cu), or an alloy thereof.

The interlayer insulating film 337 may be formed on the gate electrode 332 and the gate line. The interlayer insulating film 337 may be formed as an inorganic film such as, for example, a silicon oxide film, a silicon nitride film, or a multilayer film thereof.

The source electrode 333, the drain electrode 334, and a data line may be formed on the interlayer insulating film 337. The source electrode 333 and the drain electrode 334 may be connected to the active layer 331 through contact holes penetrating the gate insulating film 336 and the interlayer insulating film 337. The source electrode 333, the drain electrode 334, and the data line may be formed as single- or multilayer films using Mo, Al, Cr, Au, Ti, Ni, Nd, Cu, or an alloy thereof.

The passivation film 338 may be formed on the source electrode 333, the drain electrode 334, and the data line to insulate the TFTs 335. The passivation film 338 may be formed as an inorganic film such as, for example, a silicon oxide film, a silicon nitride film, or a multilayer film thereof.

The planarization film 339 may be formed on the passivation film 338 to planarize height differences formed by the TFTs 335. The planarization film 339 may be formed as an organic film using an acrylic resin, an epoxy resin, a phenolic resin, a polyamide resin, or a polyimide resin.

The light-emitting element layer EML is formed on the TFT layer TFTL. The light-emitting element layer EML includes the light-emitting elements and a pixel-defining film 344.

The light-emitting elements and the pixel-defining film 344 are formed on the planarization film 339. The light-emitting elements may be OLEDs. In this case, each of the light-emitting elements may include an anode electrode 341, a light-emitting layer 342, and a cathode electrode 343.

The anode electrode 341 may be formed on the planarization film 339. The anode electrode 341 may be connected to the source electrode 333 through a contact hole penetrating the passivation film 338 and the planarization film 339.

The pixel-defining film 344 may be formed to cover the edges of the anode electrode 341 to define a corresponding pixel. That is, the pixel-defining film 344 may define a plurality of pixels (PX1, PX2, and PX3). Each of the plurality of pixels (PX1, PX2, and PX3) may be a region in which the anode electrode 341, the light-emitting layer 342, and the cathode electrode 343 are sequentially stacked and holes from the anode electrode 341 and electrons from the cathode electrode 343 are combined in the light-emitting layer 342 to emit light.

The light-emitting layer 342 is formed on the anode electrode 341 and on the pixel-defining film 344. The light-emitting layer 342 may be an organic light-emitting layer. The light-emitting layer 342 may emit one of red light, green light, and blue light. Alternatively, the light-emitting layer 342 may be a white light-emitting layer emitting white light. In this case, the light-emitting layer 342 may have a stack of red light-, green light-, and blue light-emitting layers and may be a common layer formed commonly for all the pixels (PX1, PX2, and PX3). Also, in this case, the display panel 300 may further include a color filter layer for displaying red, green, and blue.

The light-emitting layer 342 may include a hole transport layer, an emission layer, and an electron transport layer. The light-emitting layer 342 may have a tandem structure with two or more stacks, in which case, a charge generating layer may be formed between the stacks.

The cathode electrode 343 may be formed on the light-emitting layer 342. The cathode electrode 343 may be formed to cover the light-emitting layer 342. The cathode electrode 343 may be a common layer formed commonly for all the plurality of pixels.

In a case where the light-emitting element layer EML is formed as a top emission-type light-emitting element layer that emits light in an upper direction, the anode electrode 341 may be formed of a metallic material with high reflectance such as a stack of Al and Ti (e.g., Ti/Al/Ti), a stack of Al and indium tin oxide (ITO) (e.g., ITO/Al/ITO), a silver-palladium-copper (APC) alloy, or a stack of an APC alloy and ITO (e.g., ITO/APC/ITO), and the cathode electrode 343 may be formed of a transparent conductive oxide (TCO) material such as ITO or indium zinc oxide (IZO) that can transmit light therethrough or a translucent metallic material such as magnesium (Mg), Ag, or an alloy thereof. In a case where the cathode electrode 343 is formed of a translucent metallic material, the emission efficiency of the light-emitting element layer EML can be improved due to a microcavity effect.

In a case where the light-emitting element layer EML is formed as a bottom emission-type light-emitting element layer that emits light in a downward direction, the anode electrode 341 may be formed of a TCO material such as ITO or IZO or a translucent metallic material such Mg, Ag, or an alloy thereof, and the cathode electrode 343 may be formed of a metallic material with high reflectance such as a stack of Al and Ti (e.g., Ti/Al/Ti), a stack of Al and ITO (e.g., ITO/Al/ITO), an APC alloy, or a stack of an APC alloy and ITO (e.g., ITO/APC/ITO). In a case where the anode electrode 341 is formed of a translucent metallic material, the emission efficiency of the light-emitting element layer EML can be improved due to a micro-cavity effect.

The thin-film encapsulation layer TFEL is formed on the light-emitting element layer EML. The thin-film encapsulation layer TFEL prevents or suppresses oxygen or moisture from infiltrating into the light-emitting layer 342 and the cathode electrode 343. To this end, the thin-film encapsulation layer TFEL may include at least one inorganic film. The inorganic film may be formed of silicon nitride, aluminum nitride, zirconium nitride, titanium nitride, hafnium nitride, tantalum nitride, silicon oxide, aluminum oxide, or titanium oxide. The thin-film encapsulation layer TFEL may further include at least one organic film. The organic film may be formed to a sufficient thickness to prevent or suppress foreign particles from entering the light-emitting layer 342 and the cathode electrode 343 through the thin-film encapsulation layer TFEL. The organic film may include one of epoxy, acrylate, and urethane acrylate.

The touch sensor layer TSL is formed on the thin-film encapsulation layer TFEL. Since the touch sensor layer TSL is disposed directly on the thin-film encapsulation layer TFEL, the thickness of the display device 10 can be reduced as compared to a case where a separate touch panel including the touch sensor layer TSL is attached on the thin-film encapsulation layer TFEL.

The touch sensor layer TSL may include touch electrodes for detecting touch input from the user in a capacitive manner and touch lines for connecting pads and the touch electrodes. For example, the touch sensor layer TSL may detect touch input from the user in a self-capacitance manner or a mutual capacitance manner.

The touch electrodes of the touch sensor layer TSL may be disposed in the display area. The touch lines of the touch sensor layer TSL may be disposed in the non-display area.

In a protruding area PA, which is provided on one side of the display panel 300, the display circuit board 310 and the display driving unit 320 may be attached. One end of the display circuit board 310 may be attached, via an anisotropic conductive film (ACF), on pads provided in the protruding area PA of the display panel 300. The protruding area PA of the display panel 300 and the display circuit board 310 may be bent toward the bottom of the display panel 300.

The display driving unit 320 receives control signals and power supply voltages via the display circuit board 310 and generates and outputs signals and voltages for driving the display panel 300. The display driving unit 320 may be fabricated as an integrated circuit (IC) and may then be attached on the protruding area PA of the display panel 300 in a chip-on-glass (COG) or chip-on-plastic (COP) manner or through ultrasonic bonding, but the present disclosure is not limited thereto. The display driving unit 320 may be attached on the display circuit board 310.

The display circuit board 310 may include first and second circuit boards 311 and 312, as illustrate din FIG. 4. One end of the first circuit board 311 may be attached to the pads in the protruding area PA, which is provided on one side of the display panel 300. The other end of the first circuit board 311 may be connected to a first connector 312a of the second circuit board 312. The second connector 312b of the second circuit board 312 may be connected to one end of a flexible printed circuit board (FPCB) 580. A third connector 312c of the second circuit board 312 may be connected to one end of a cable 314. A sound driving unit 330 and a touch driving unit (not illustrated) may be disposed on a first surface of the second circuit board 312. In this case, the first connector 312a, the second connector 312b, and the third connector 312c may be disposed on a second surface of the second circuit board 312. The second surface of the second circuit board 312 may be the surface of the second circuit board 312 that faces the panel bottom member 400.

The other end of the cable 314 may be connected to a main connector 830 of the main circuit board 800, which is disposed below the middle frame 700, via a cable hole CAH that penetrates the middle frame 700, as illustrated in FIGS. 5 and 6.

One end of the FPCB 580 may be electrically connected to the second connector 312b of the second circuit board 312, and the other end of the FPCB 580 may be electrically connected to the vibration generating device 500, as illustrated in FIG. 7A. The FPCB 580 may receive first and second driving voltages from the sound driving unit 330 and may transmit the first and second driving voltages to the vibration generating device 500.

Although not specifically illustrated, the touch driving unit may be disposed on the display circuit board 310. The touch driving unit may be fabricated as an IC and may then be attached to the top surface of the display circuit board 310. The touch driving unit may be connected to the touch electrodes and the touch lines of the touch sensor layer TSL of the display panel 300 via the display circuit board 310. The touch driving unit may sense touch input in a mutual-capacitance manner by applying touch driving signals to some of the touch electrodes of the touch sensor layer TSL, i.e., driving electrodes, and detecting charge variations in the capacitances between the driving electrodes and the other touch electrodes of the touch sensor layer TSL, i.e., sensing electrodes, with the use of the sensing electrodes.

The panel bottom member 400 may be disposed below the display panel 300. The panel bottom member 400 may be attached to the bottom surface of the display panel 300 via an adhesive member, as illustrated in FIG. 8. The adhesive member may be an OCA, an OCR, or a pressure sensitive adhesive (PSA). The panel bottom member 400 will be described later in detail.

The display circuit board 310, the vibration generating device 500, and the vibration transmitting member 600 may be attached to the bottom of the panel bottom member 400. The display circuit board 310 may be attached to the bottom surface of the panel bottom member 400 via an adhesive member or a fixing member. The vibration transmitting member 600 may be attached to the bottom surface of the panel bottom member 400 via an adhesive member, e.g., a second adhesive member PSA2 of FIG. 8. The vibration generating device 500 may be attached to the bottom surface of the vibration transmitting member 600. Here, the adhesive member may be a PSA, and the fixing member may be a screw. However, the present disclosure is not limited to this, and various members other than an adhesive member may be further provided between the vibration generating device 500 and the vibration transmitting member 600.

The vibration generating device 500 may include a first vibration layer which has a piezoelectric material that contracts or expands in accordance with driving voltages. In a case where the vibration generating device 500 vibrates within a first frequency range, the display panel 300 can be vibrated by the vibration generating device 500, and as a result, the first sound can be output. In a case where the vibration generating device 500 vibrates within a second frequency range, a haptic feedback can be provided to the user by the vibration of the vibration generating device 500. The second frequency range may be a range of frequencies lower than the first frequency range.

The vibration transmitting member 600 may be disposed to overlap with the vibration generating device 500. Vibration generated by the vibration generating device 500 is transmitted to the display panel 300 via the vibration transmitting member 600. The vibration generating member 600 may be attached to the vibration generating device 500 via an adhesive member or may be disposed to overlap with the vibration generating device 500 in a thickness direction with an intervening member therebetween. The vibration transmitting member 600 may be disposed to overlap with the vibration generating device 500 in a third direction (or a Z-axis direction), i.e., in the thickness direction, and may thus transmit vibration generated by the vibration generating device 500 to the display panel 300. The display device 10 includes the vibration transmitting member 600 and can thus improve the transmission of vibration generated by the vibration generating device 500. The vibration transmitting member 600 may include a material with a large modulus and can thus minimize loss of vibration when transmitting the vibration to the display panel 300 through the panel bottom member 400.

Since the vibration generating device 500 is disposed on a first surface of the vibration generating member 600, a width W3, in the first direction (or the X-axis direction), of the vibration generating device 500 may be smaller than a width W4, in the first direction (or the X-axis direction), of the vibration transmitting member 600, and a width W5, in the second direction (or the Y-axis direction), of the vibration generating device 500 may be smaller than a width W6, in the second direction (or the Y-axis direction), of the vibration transmitting member 600. Also, the vibration transmitting member 600 may include a material with a large modulus to transmit vibration. The vibration transmitting member 600 may include a metallic material. For example, the vibration transmitting member 600 may be a stainless metal plate. The vibration transmitting member 600 may have a sufficient thickness to properly transmit the vibration of the vibration generating device 500 to the display panel 300. For example, the vibration transmitting member 600 may have a thickness of 25 μm to 50 μm, but the present disclosure is not limited thereto.

The vibration transmitting member 600 may be disposed below the panel bottom member 400. The vibration transmitting member 600 may be disposed between the vibration generating device 500 and the display panel 300. Specifically, the vibration transmitting member 600 may be disposed below the panel bottom member 400 or may be embedded in the panel bottom member 400. FIG. 7A illustrates that the vibration transmitting member 600 is disposed below the panel bottom member 400, but the present disclosure is not limited thereto.

FIG. 7B is another exemplary cross-sectional view taken along line I-I' of FIG. 4.

Referring to FIG. 7B, the vibration transmitting member 600 may be disposed in the panel bottom member 400 to be a predetermined distance apart from the vibration generating device 500. The vibration transmitting member 600 may be disposed in an opening that exposes portion of the panel bottom member 400 and may thus be located on the same plane as some elements of the panel bottom member 400. For convenience, the example in which the vibration transmitting member 600 is disposed below the panel bottom member 400 will hereinafter be described, and various other examples of the arrangement of the vibration transmitting member 600 will be described later.

The vibration generating device 500 may be electrically connected to the sound driving unit 330, which drives the vibration generating device 500, via the FPCB 580. The sound driving unit 330 may be fabricated as an IC and may then be attached to a second surface of the FPCB 580. A first surface of the FPCB 580 may be the surface of the FPCB 580 that faces the panel bottom member 400, and the second surface of the FPCB 580 may be the surface of the FPCB 580 that is opposite to the first surface of the FPCB 580.

In a sound mode, the sound driving unit 330 receives 1A-th vibration data from a main processor 810. The sound driving unit 330 generates 1A-th and 2A-th driving voltages in accordance with the 1A-th vibration data and provides the 1A-th and 2A-th driving voltages to the vibration generating device 500 via the FPCB 580. As a result, the vibration generating device 500 vibrates within the first frequency range, thereby vibrating the display panel 300 and outputting the first sound.

In a haptic mode, the sound driving unit 330 receives 1B-th vibration data from the main processor 810. The sound driving unit 330 generates 1B-th and 2B-th driving voltages in accordance with the 1B-th vibration data and provides the 1B-th and 2B-th driving voltages to the vibration generating device 500 via the FPCB 580. As a result, the vibration generating device 500 vibrates within the second frequency range, thereby providing a haptic feedback.

The sound driving unit 330 may include a digital signal processor (DSP) which processes first vibration data, including the 1A-th and 1B-th vibration data, second vibration data, or sensing control data, a digital-to-analog converter (DAC) which converts digital data processed by the DSP into analog signals, i.e., driving voltages, and an amplifier (AMP) which amplifies and outputs the driving voltages output by the DAC.

FIG. 4 illustrates that the vibration generating device 500 and the vibration transmitting member 600 are disposed closer to the lower side than to the upper side of the display panel 300, but the locations of the vibration generating device 500 and the vibration transmitting member 600 are not particularly limited. The vibration generating device 500 and the vibration transmitting member 600 may be disposed in portion of the display area of the display panel 300 with no particular mechanical interference.

For example, the vibration generating device 500 and the vibration transmitting member 600 may be disposed in an area that does not overlap with the display circuit board 310 and with a battery hole BH and camera holes CMH1 formed in the middle frame 700. The numbers of vibration generating devices 500 and vibration transmitting members 600 provided in the display device 10 are not particularly limited, and the display device 10 may include more than one vibration generating device 500 and more than one vibration transmitting member 600. For example, two vibration generating devices 500 may be disposed at the top and the bottom of the display panel 300, and the vibration transmitting member 600 may be disposed on the entire surface of the panel bottom member 400 or may be disposed to form patterns. In this manner, sound can be delivered through the entire surface of the display panel 300 or the display device 10.

The middle frame 700 may be disposed below the panel bottom member 400. The middle frame 700 may include plastic, a metal, or both.

A first camera hole CMH1, in which a camera device 820 is inserted, the battery hole BH, in which a battery is disposed, and the cable hole CAH, which is penetrated by the cable 314 that is connected to the display circuit board 310 may be formed in the middle frame 700. A receiving groove AH, which is for receiving the vibration generating device 500, may also be formed in the middle frame 700. The width, in the first direction (or the X-axis direction), of the receiving groove AH may be greater than the width, in the first direction (or the X-axis direction), of the vibration generating device 500. The width, in the second direction (or the Y-axis direction), of the receiving groove AH may be greater than the width, in the second direction (or the Y-axis direction), of the vibration generating device 500.

In a case where the vibration generating device 500 overlaps with the battery hole BH, the vibration generating device 500 may be affected by heat generated by the battery. Thus, the vibration generating device 500 may preferably be disposed not to overlap with the battery hole BH.

The main circuit board 800 may be disposed below the middle frame 700. The main circuit board 800 may be a printed circuit board (PCB) or an FPCB.

The main circuit board 800 may include a main processor 810, the camera device 820, and a main connector 830. The camera device 820 may be disposed on both the top surface and the bottom surface of the main circuit board 800, the main processor 810 may be disposed on the top surface of the main circuit board 800, and the main connector 830 may be disposed on the bottom surface of the main circuit board 800.

The main processor 810 may control all functions of the display device 10. For example, the main processor 810 may output digital video data to the display driving unit 320 via the display circuit board 310 so as for the display panel 300 to display an image. Also, the main processor 810 may receive touch data from the touch driving unit, may determine the location of touch input from the user, and may execute an application pointed to by an icon displayed at the location of the touch input.

Also, the main processor 810 may output the first vibration data to the sound driving unit 330, which drives the vibration generating device 500, to vibrate the vibration generating device 500 in both the sound mode and the haptic mode.

The main processor 810 may be an application processor, a central processing unit, or a system-on-chip (SoC) that consists of ICs.

The camera device 820 processes image frames such as still images or moving images obtained by an image sensor in a camera mode and outputs the processed image frames to the main processor 810.

The cable 314, which passes through the cable hole CAH of the middle frame 700, may be connected to the main connector 830. Accordingly, the main circuit board 800 may be electrically connected to the display circuit board 310.

A mobile communication module, which can exchange wireless signals with at least one of a base station, an external terminal, and a server via a mobile communication network, may be further provided on the main circuit board 800. The wireless signals may include various types of data associated with the transmission/reception of audio signals, video call signals, or text/multimedia messages.

The lower cover 900 may be disposed below the middle frame 700 and the main circuit board 800. The lower cover 900 may be coupled and fixed to the middle frame 700. The lower cover 900 may form the bottom exterior of the display device 10. The lower cover 900 may include plastic and/or a metal.

A second camera hole CMH2, in which the camera device 820 is inserted to protrude outwardly, may be formed in the lower cover 900. The location of the camera device 820 and the locations of the first and second camera holes CMH1 and CMH2 corresponding to the camera device 820 are not particularly limited.

The display device 10 includes the vibration generating device 500, which is disposed below the panel bottom member 400 of the display panel 300, and the vibration transmitting member 600, which is disposed between the vibration generating device 500 and the display panel 300. Accordingly, the display device 10 can output sound and provide a haptic feedback by using the vibration generating device 500, which is not exposed to the outside. Also, by using the vibration transmitting member 600, the display device 10 can amplify sound generated by the vibration generating device 500 and can transmit vibration to output sound at the front thereof. Thus, since a call receiver for outputting voices can be removed from the front of the display device 10, the light-transmitting area DA of the cover window 100 can be widened, and the display area of the display panel 300 can also be widened. The panel bottom member 400 of the display panel 300, the vibration generating device 500, and the vibration transmitting member 600 will hereinafter be described.

FIG. 8 is an exemplary cross-sectional view taken along line II-IF of FIG. 4.

Referring to FIG. 8, the display device 10 may include the display panel 300, the panel bottom member 400, the vibration generating device 500, which is disposed below the display panel 300, and the vibration transmitting member 600, which is disposed between the vibration generating device 500 and the display panel 300. The display device 10 may further include the polarizing film PF and the cover window 100 at the top of the display panel 300, the vibration transmitting member 600 may be disposed on the bottom surface of the panel bottom member 400, and the vibration generating device 500 may be disposed on the bottom surface of the vibration transmitting member 600. However, the present disclosure is not limited to this, and the arrangement and the structures of the vibration generating device 500 and the vibration transmitting member 600 may vary. The cover window 100, the polarizing film PF, and the display panel 300 are as already described above. Thus, the panel bottom member 400, the vibration generating device 500, and the vibration transmitting member 600 will hereinafter be described in detail.

The panel bottom member 400 may be disposed below the display panel 300. The panel bottom member 400 may be attached to the bottom surface of the display panel 300 via a first adhesive member PSA1. The first adhesive member PSA1 may be an OCA or an OCR.

The panel bottom member 400 may include a buffer member 410 for absorbing external shock, a film layer 430, a shielding member 450 for blocking electromagnetic waves, and a heat dissipation member 470 for dissipating heat from the display panel 300, but the present disclosure is not limited thereto. The panel bottom member 400 may further include a light-blocking layer and a light-absorbing member for blocking light incident thereupon from the outside. The light-absorbing member may be disposed below the display panel 300, and the light-absorbing member may block the transmission of light and may thus prevent or suppress elements disposed therebelow, i.e., the vibration generating device 500, the display circuit board 310, and the like, from becoming visible from above the display panel 300. For example, the light-absorbing member may include a light-absorbing material such as a black pigment or dye.

The buffer member 410 may be disposed below the first adhesive member PSA1 or the light-absorbing member. The buffer member 410 absorbs external shock to prevent or protect the display panel 300 from being damaged. The buffer member 410 may be formed as a single-layer film or a multilayer film. For example, the buffer member 410 may include a polymer resin such as polyurethane, polycarbonate, polypropylene, or polyethylene or an elastic material such as rubber, a urethane-based material, or a sponge foamed from an acrylic-based material. The buffer member 410 may be a cushion layer.

The film layer 430 may be disposed below the buffer member 410. The film layer 430 may be formed as a flexible thin film. For example, the film layer 430 may include polyallylate, polyimide, polycarbonate, cellulose triacetate, cellulose acetate propionate, or a combination thereof.

The shielding member 450 may be disposed below the film layer 430. The shielding member 450 may include graphite or carbon nanotube to shield electromagnetic waves.

The heat dissipation member 470 may be disposed below the shielding member 450. The heat dissipation member 470 may be formed as a metal thin film including a metal with excellent thermal conductivity such as Cu, but the present disclosure is not limited thereto. The heat dissipation member 470 may be formed of a conductive metal.

The display device 10 may include the vibration generating device 500 and the vibration transmitting member 600, which are disposed below the display panel 300. The vibration transmitting member 600 may be disposed on the bottom surface of the panel bottom member 400, and the vibration generating device 500 may be disposed on the bottom surface of the vibration transmitting member 600. The vibration transmitting member 600 may be attached to the heat dissipation member 470 of the panel bottom member 400 via a second adhesive member PSA2, and the vibration generating device 500 may be attached to the vibration transmitting member 600 via a third adhesive member PSA3.

The vibration generating device 500 may include a piezoelectric actuator. In this case, the vibration generating device 500 may vibrate by applying an alternating current (AC) voltage to contract and expand the piezoelectric actuator. Due to the vibration of the vibration generating device 500, the display panel 300 may vertically vibrate, and as a result, sound can be output at the front of the display device 10. As already mentioned above, the vibration generating device 500 may be electrically connected to the second circuit board 312 via the FPCB 580 and may receive sound data via the sound driving unit 330, which is disposed on the second circuit board 312.

Figure 9:
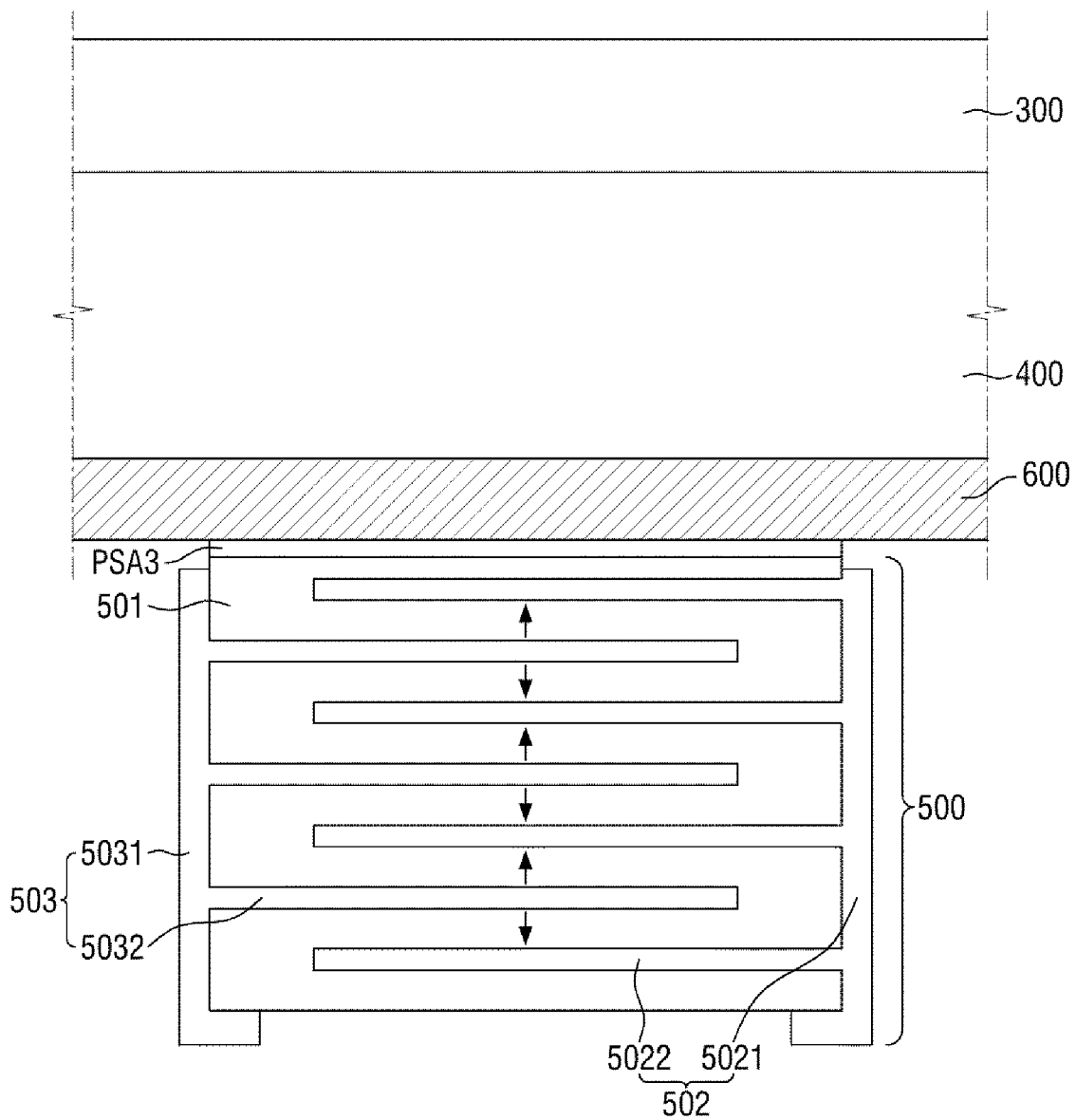
FIG. 9 is a cross-sectional view illustrating a vibration generating device according to an exemplary embodiment of the present disclosure.

FIG. 9 is a cross-sectional view of a vibration generating device according to an exemplary embodiment of the present disclosure.

Referring to FIG. 9, a vibration generating device 500 receives driving voltages and causes vibration, thereby outputting sound or providing a haptic feedback. The vibration generating device 500 may include a first vibration layer 501, a first electrode 502, and a second electrode 503.

The first electrode 502 may include a first stem electrode 5021 and first branch electrodes 5022. The first stem electrode 5021 may be disposed on one side of the first vibration layer 501 or on multiple sides of the first vibration layer 501.

The first branch electrodes 5022 may branch off from the first stem electrode 5021. The first branch electrodes 5022 may be disposed to be parallel to one another. For example, the first stem electrode 5021 may extend in a third direction (or a Z-axis direction), and the first branch electrodes 5022 may extend from the first stem electrode 5021 in a first direction (or an X-axis direction) or in a second direction (or a Y-axis direction). The first branch electrodes 5022 may be inserted in the first vibration layer 501 and may be disposed on the bottom surface of the first vibration layer 501.

The second electrode 503 may include a second stem electrode 5031 and second branch electrodes 5032. The second stem electrode 5031 may be disposed on the other side of the first vibration layer 501 or on multiple sides of the first vibration layer 501. In this case, the first stem electrode 5021 may be disposed on one of the multiple sides of the first vibration layer 501 where the second stem electrode 5031 is disposed. The second stem electrode 5031 may be disposed on the top surface of the first vibration layer 501. The first stem electrode 5021 and the second stem electrode 5031 may not overlap with each other. The second branch electrodes 5032 may branch off from the second stem electrode 5031. The second branch electrodes 5032 may be disposed to be parallel to one another. For example, the second stem electrode 5031 may extend in the third direction (or the Z-axis direction), and the second branch electrodes 5032 may extend from the second stem electrode 5031 in the first direction (or the X-axis direction) or in the second direction (or the Y-axis direction). The second branch electrodes 5032 may be inserted in the first vibration layer 501 and may be disposed on the bottom surface of the first vibration layer 501.

The first branch electrodes 5022 and the second branch electrodes 5032 may be disposed to be parallel to one another in the first direction (or the X-axis direction) or in the second direction (or the Y-axis direction). Also, the first branch electrodes 5022 and the second branch electrodes 5032 may be alternately arranged in the third direction (or the Z-axis direction). That is, the first branch electrodes 5022 and the second branch electrodes 5032 may be arranged in the third direction (or the Z-axis direction) in the order of a first branch electrode 5022, a second branch electrode 5032, a first branch electrode 5022, a second branch electrode 5032, . . . .

The first and second electrodes 502 and 503 may be electrically connected to the leads of the FPCB 580. Accordingly, the first driving voltage may be applied from the sound driving unit 330 of the FPCB 580 to the first electrode 502, and the second driving voltage may be applied from the sound driving unit 330 of the FPCB 580 to the second electrode 503. The first driving voltage may include the 1A-th and 1B-th driving voltages, and the second driving voltage may include the 2A-th and 2B-th driving voltages.

The first vibration layer 501 may include a piezoelectric material that is deformed in accordance with the first and second driving voltages applied to the first and second electrodes 502 and 503, respectively. The piezoelectric material may be one of a polyvinylidene fluoride (PVDF) film, plumbium zirconate titanate (PZT), and an electroactive polymer.

Since the first vibration layer 501 is fabricated at high temperature, the first and second electrodes 502 and 503 may be formed of Ag or an alloy of Ag and Pd. In this case, in each of the first and second electrodes 502 and 503, the content of Ag may be higher than the content of Pd.

The first vibration layer 501 may be disposed between the first branch electrodes 5022 and the second branch electrodes 5032. The first vibration layer 501 may contract or expand in accordance with the first driving voltage applied to the first branch electrodes 5022 and the second driving voltage applied to the second branch electrodes 5032.

Figure 10:
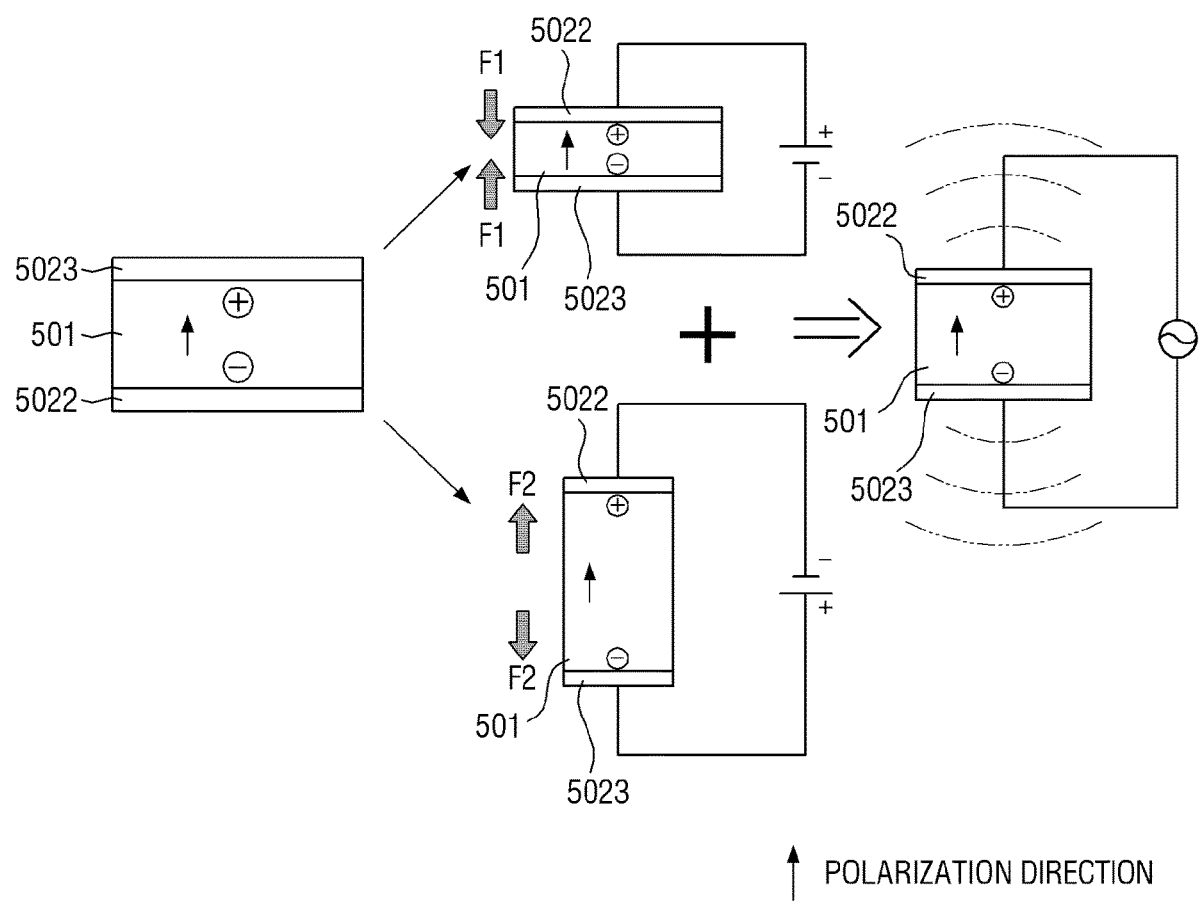
FIG. 10 illustrates how a first vibration layer disposed between first branch electrodes and second branch electrodes of the vibration generating device of FIG. 9 vibrates.
Figure 11:
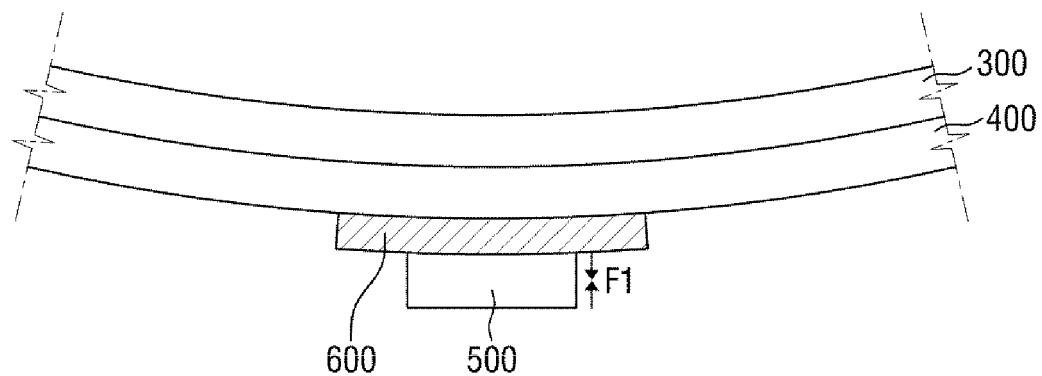
FIGS. 11 and 12 are side views illustrating how the vibration generating device of FIG. 9 vibrates a display panel.
Figure 12:
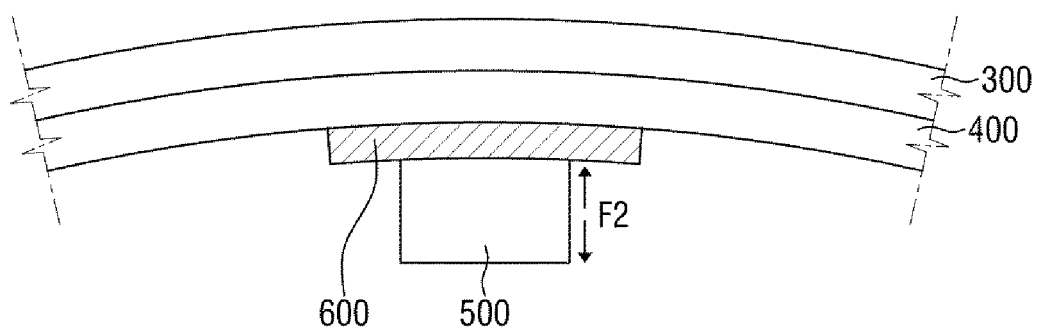
Figure 12:
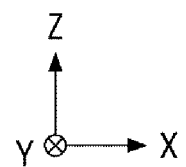

FIG. 10 illustrates how the first vibration layer disposed between the first branch electrodes and the second branch electrodes of the vibration generating device of FIG. 9 vibrates. FIGS. 11 and 12 are side views illustrating how the vibration generating device of FIG. 9 vibrates a display panel.

Referring to FIGS. 10, 11, and 12, in a case where the polarity of the first vibration layer 501 between the first branch electrodes 5022 and their respective underlying second branch electrodes 5032 has an upward direction (↑), the first vibration layer 501 may have a positive polarity in upper portions thereof adjacent to the first branch electrodes 5022 and a negative polarity in lower portions thereof adjacent to the second branch electrodes 5032. Also, in a case where the polarity of the first vibration layer 501 between the second branch electrodes 5032 and their respective underlying first branch electrodes 5022 has a downward direction (↓), the first vibration layer 501 may have a negative polarity in the upper portions thereof adjacent to the first branch electrodes 5022 and a positive polarity in the lower portions thereof adjacent to the second branch electrodes 5032. The direction of the polarity of the first vibration layer 501 may be determined by a poling process for applying an electric field to the first vibration layer 501 using the first branch electrodes 5022 and the second branch electrodes 5032.

In a case where the direction of the polarity of the first vibration layer 501 between the first branch electrodes 5022 and their respective underlying second branch electrodes 5032 is the upward direction (↑), a positive first driving voltage and a negative second driving voltage may be applied to the first branch electrodes 5022 and the second branch electrodes 5032, respectively. Then, the first vibration layer 501 may contract in accordance with a first force F1. Here, the first force F1 may be a contraction force. On the contrary, in response to a negative first driving voltage and a positive second driving voltage being applied to the first branch electrodes 5022 and the second branch electrodes 5032, respectively, the first vibration layer 501 may expand in accordance with a second force F2. Here, the second force F2 may be an extension force.

Similarly, in a case where the direction of the polarity of the first vibration layer 501 between the second branch electrodes 5032 and their respective underlying first branch electrodes 5022 is the downward direction (↓), the positive second driving voltage and the negative first driving voltage being applied to the second branch electrodes 5032 and the first branch electrodes 5022, respectively. Then, the first vibration layer 501 may expand in accordance with an extension force. On the contrary, in response to the negative 2A-th driving voltage and the positive first driving voltage being applied to the second branch electrodes 5032 and the first branch electrodes 5022, respectively, the first vibration layer 501 may contract in accordance with the second force F2. Here, the second force F2 may be contraction force.

According to the exemplary embodiment of FIG. 8, in a case where the first and second driving voltages applied to the first and second electrodes 502 and 503, respectively, alternately change from a positive polarity to a negative polarity, the first vibration layer 501 contracts and expands repeatedly. As a result, the vibration generating device 500 vibrates.

Since the vibration generating device 500 is disposed on one surface of the panel bottom member 400, e.g., the bottom surface of the panel bottom member 400, the display panel 300 may vertically vibrate, as illustrated in FIGS. 11 and 12, in response to the contraction and the expansion of the first vibration layer 501 of the vibration generating device 500. Since the display panel 300 can be vibrated by the vibration generating device 500, the display device 10 can output sound.

Here, the sound pressure of sound output by the display device 10 may vary depending on the vibration transmission rate of the panel bottom member 400. Since vibration generated by the vibration generating device 500 is transmitted to the display panel 300 via the panel bottom member 400, the sound pressure of sound output by the vibration transmitted to the display panel 300 may vary depending on the thickness and the material of the panel bottom member 400. Since the display device 10 includes the vibration transmitting member 600, which is disposed between the vibration generating device 500 and the display panel 300, the transmission of vibration generated by the vibration generating device 500 can be improved. Due to the presence of the vibration transmitting member 600, which has a high vibration transmission rate, the display device 10 can properly transmit vibration generated by the vibration generating device 500 to the display panel 300 and can minimize loss of sound pressure when outputting sound via the vibration of the display panel 300.

As the first vibration layer 501 of the vibration generating device 500 continues to contract and expand, the vibration transmitting member 600 continues to vibrate vertically. The vibration transmitting member 600 can transmit vibration generated in accordance with the movement of the first vibration layer 501 of the vibration generating device 500 to the display panel 300. Since the vibration transmitting member 600 includes a metallic material with a large modulus, vibration generated by the vibration generating device 500 can be properly transmitted to the display panel 300 via the panel bottom member 400.

Figure 13:
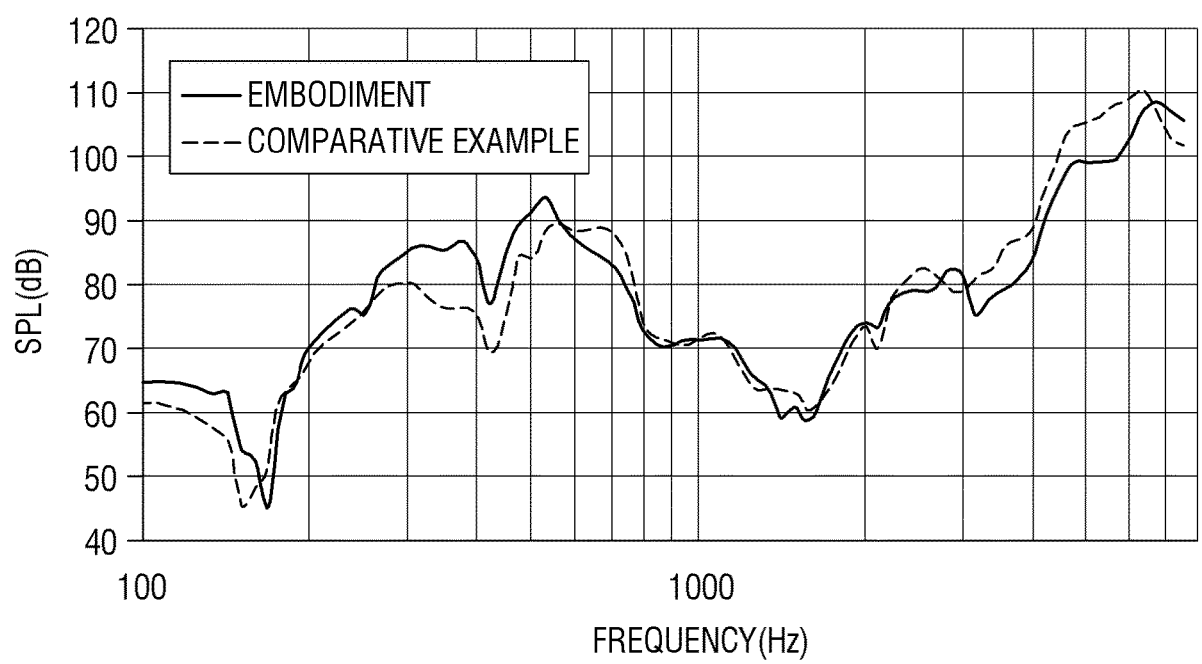
FIG. 13 is a graph showing sound pressure measured, for each frequency, from sound generated by the vibration generating device of FIG. 9.

FIG. 13 is a graph showing sound pressure measured, for each frequency, from sound generated by the vibration generating device of FIG. 9.

Referring to FIG. 13, "Embodiment", which refers to the display device 10 including the vibration transmitting member 600, can increase sound pressure by up to 10 dB, as compared to "Comparative Example", which refers to a display device not including the vibration transmitting member 600. Since vibration generated by the vibration generating device 500 can be properly transmitted to the display panel 300 without being lost in the panel bottom member 400, the sound pressure of sound output via the display panel 300 can be increased. Since the display device 10 includes the vibration transmitting member 600, which is disposed to overlap with the vibration generating device 500, the loss of sound pressure of sound output by the display device 10 can be minimized.

Meanwhile, the vibration transmitting member 600 may be disposed on the bottom surface of the panel bottom member 400, but the location of the vibration transmitting member 600 is not particularly limited. For example, the vibration transmitting member 600 may be embedded in the panel bottom member 400 or may be disposed in the opening of the panel bottom member 400. Various examples of the arrangement of the vibration transmitting member 600 will hereinafter be described.

Figure 14:
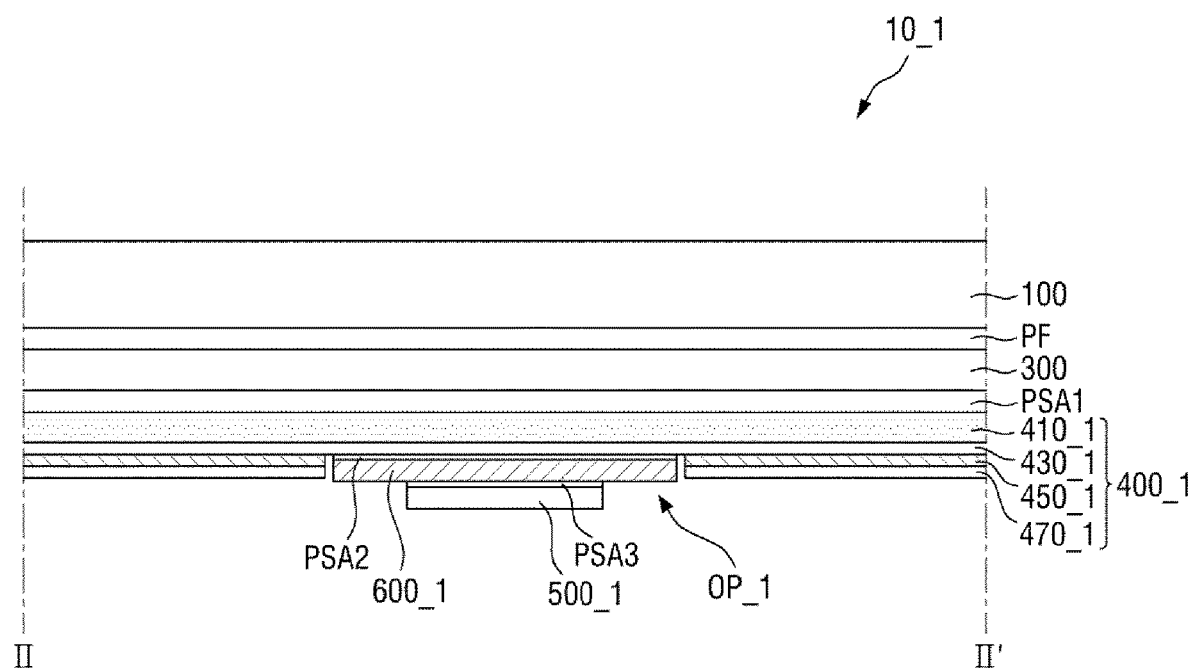
FIGS. 14, 15, and 16 are cross-sectional views, taken along line II-IF of FIG. 4, of display devices according to other exemplary embodiments of the present disclosure.
Figure 15:
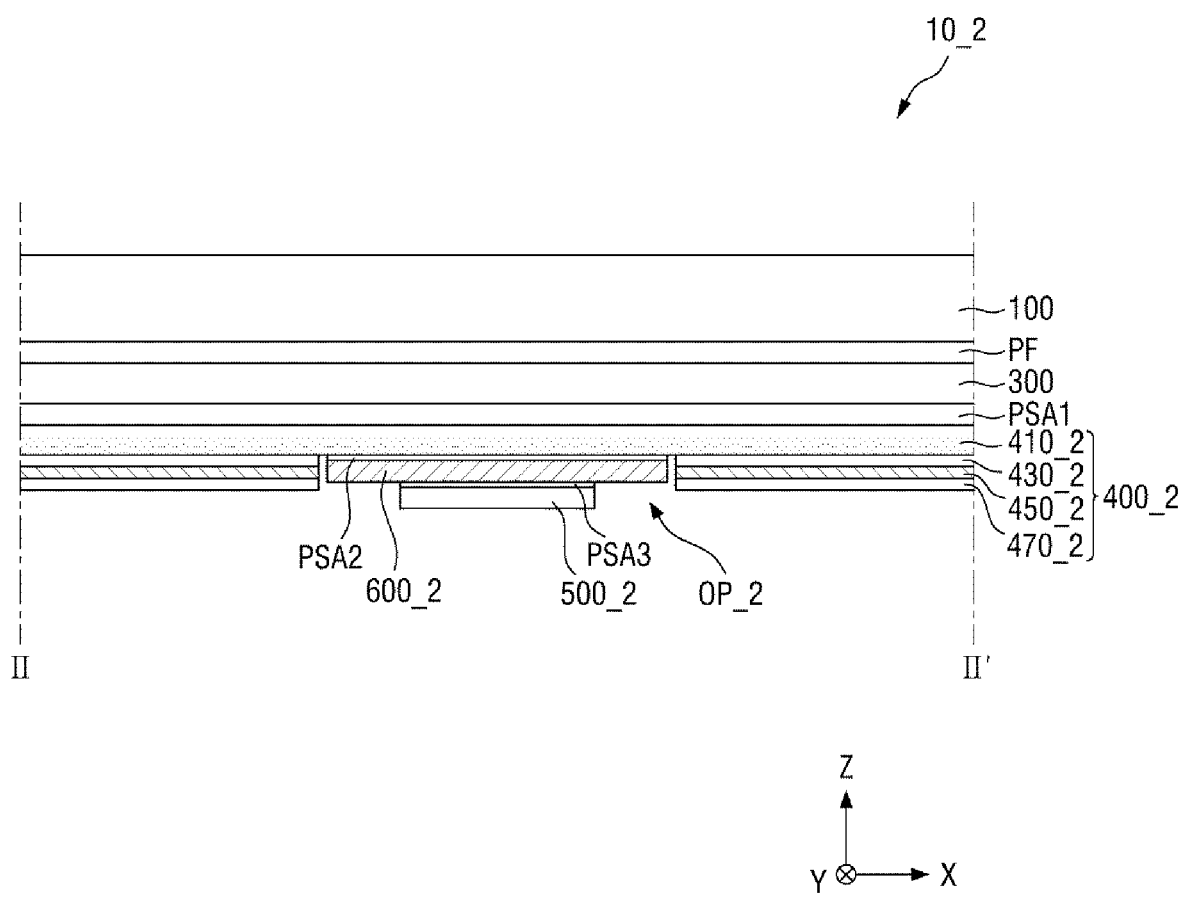
Figure 16:
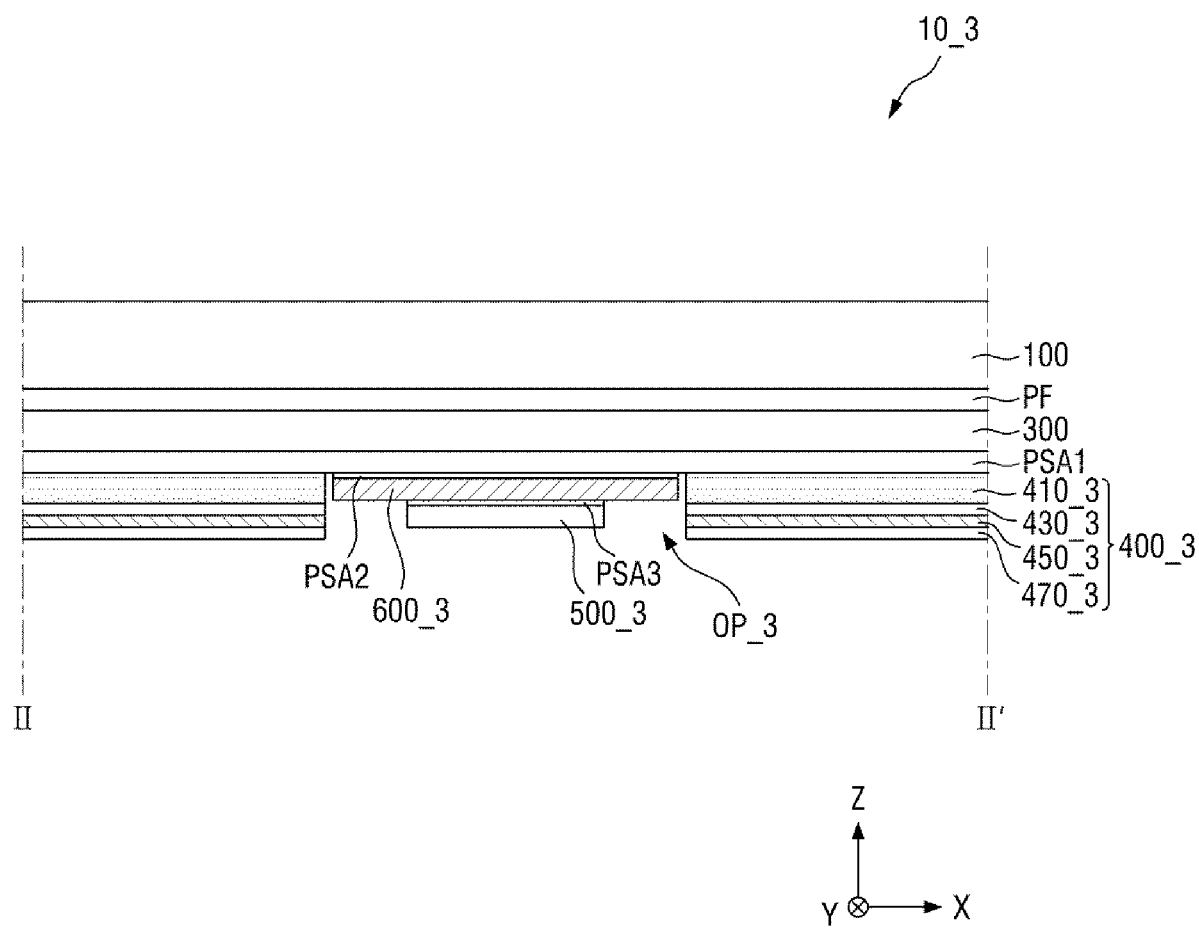

FIGS. 14, 15, and 16 are cross-sectional views, taken along line II-IF of FIG. 4, of display devices according to other exemplary embodiments of the present disclosure.

Unlike in the example of FIG. 7A, the vibration transmitting member 600 may be disposed in the panel bottom member 400. For example, the panel bottom member 400 may include an opening OP which partially exposes an element such as the film layer 430, the shielding member 450, or the like, and the vibration transmitting member 600 may be disposed on the elements exposed by the opening OP. Since the vibration transmitting member 600 is inserted in the opening OP, the distances between the display panel 300 and the vibration generating device 500 and between the display panel 300 and the vibration transmitting member 600 can be reduced.

Referring to FIG. 14, a panel bottom member 400_1 of a display device 10_1 may include an opening OP1 which exposes at least portion of a film layer 430_1, and a vibration transmitting member 600_1 may be disposed on the exposed portion of the film layer 430_1. The display device 10_1 is almost the same as the display device 10 of FIG. 7A, except for the location of the vibration transmitting member 600_1 and the shape of the panel bottom member 400_1, and thus will hereinafter be described, focusing mainly on the differences with the display device 10 of FIG. 7A.

The panel bottom member 400_1 may include the opening OP1_1, in which a shielding member 450_1 and a heat dissipation member 470_1 are not disposed to expose portion of the film layer 430_1. Portions of each of the shielding member 450_1 and the heat dissipation member 470_1 may be spaced apart from each other by the opening OP_1.

A second adhesive member PSA2 may be disposed on the exposed portion of the film layer 430_1, and the vibration transmitting member 600_1 may be attached to the film layer 430_1 via the second adhesive member PSA2. A vibration generating device 500_1 may be attached to the vibration transmitting member 600_1 via a third adhesive member PSA3. The vibration transmitting member 600_1 may be inserted in the opening OP_1 of the panel bottom member 400_1 and may thus overlap with the panel bottom member 400_1 in a surface direction, e.g., in a first direction (or an X-axis direction) or in a second direction (or a Y-axis direction). For example, the width, in the first direction (or the X-axis direction) or in the second direction (or the Y-axis direction), of the opening OP_1 may be greater than the width, in the first direction (or the X-axis direction) or in the second direction (or the Y-axis direction), of the vibration transmitting member 600_1 such that the vibration transmitting member 600_1 can be inserted in the opening OP_1. However, the present disclosure is not limited to this example.

Vibration generated by the vibration generating device 500_1 is transmitted to a display panel 300 via the vibration transmitting member 600_1. Since the vibration transmitting member 600_1 is inserted in the opening OP_1 of the panel bottom member 400_1, the distance between the vibration generating device 500_1 and the display panel 300 can be reduced. Accordingly, vibration generated by the vibration generating device 500_1 can be properly transmitted to the display panel 300 without being lost. Also, since the vibration transmitting member 600_1 does not overlap with the shielding member 450_1 and the heat dissipation member 470_1 in the thickness direction, i.e., in a direction in which vibration is transmitted, the amount of vibration transmitted to the shielding member 450_1 and the heat dissipation member 470_1 can be reduced. The shielding member 450_1, particularly, includes a material that is susceptible to shock, such as graphite or carbon nanotube. Since the vibration transmitting member 600_1 is inserted in the opening OP_1 of the panel bottom member 400_1, vibration can be properly transmitted to the display panel 300, and at the same time, damage to the shielding member 450_1 and the heat dissipation member 470_1 can be prevented or reduced.

Referring to FIG. 15, in a display device 10_2, an opening OP_2 may be formed to expose a buffer member 410_2, and a vibration transmitting member 600_2 may be attached to the buffer member 410_2 via a second adhesive member PSA2. Referring to FIG. 16, in a display device 10_3, an opening OP_3 may be formed to expose a third adhesive member PSA3, and a vibration transmitting member 600_3 may be attached to a display panel 300 via a third adhesive member PSA3. The display devices 10_2 and 10_3 of FIGS. 15 and 16 are the same as the display device 10_1 of FIG. 14, except for the location of the vibration transmitting members 600_2 and 600_3, and thus, detailed descriptions thereof will be omitted.

Meanwhile, the transmission of vibration generated by the vibration generating device 500 may vary depending on the thicknesses and the materials of the elements interposed between the vibration transmitting member 600 and the display panel 300. Also, the shielding member 450 and the heat dissipation member 470, which are susceptible to external shock, may be damaged by vibration transmitted by the vibration transmitting member 600. The display device 10 may include a hole EP which forms an empty space in the panel bottom member 400 and can thus increase the vibration transmission rate of the elements interposed between the vibration transmitting member 600 and the display panel 300, while preventing or reducing damage to elements that are susceptible to external shock.

Figure 17:
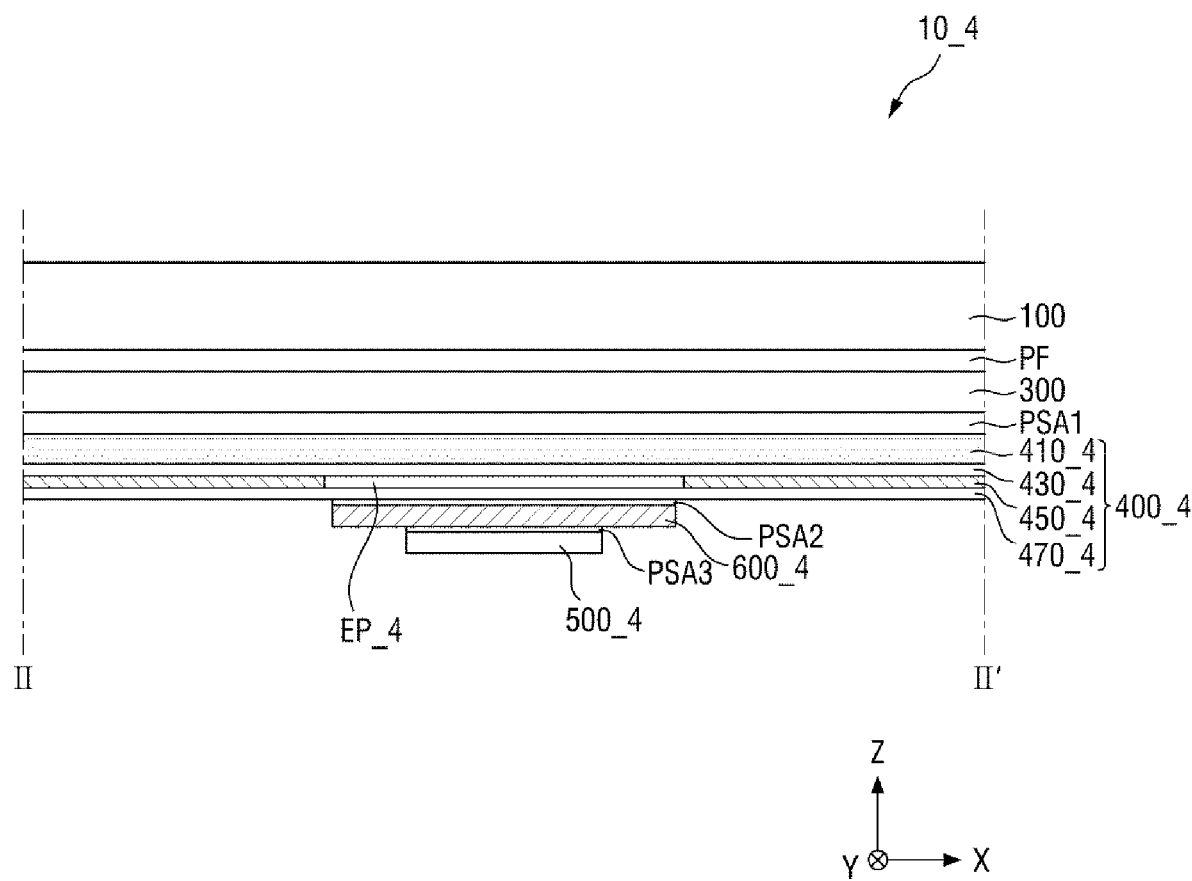
FIGS. 17 and 18 are cross-sectional views taken along line II-IF of FIG. 4, of display devices according to other exemplary embodiments of the present disclosure.
Figure 18:
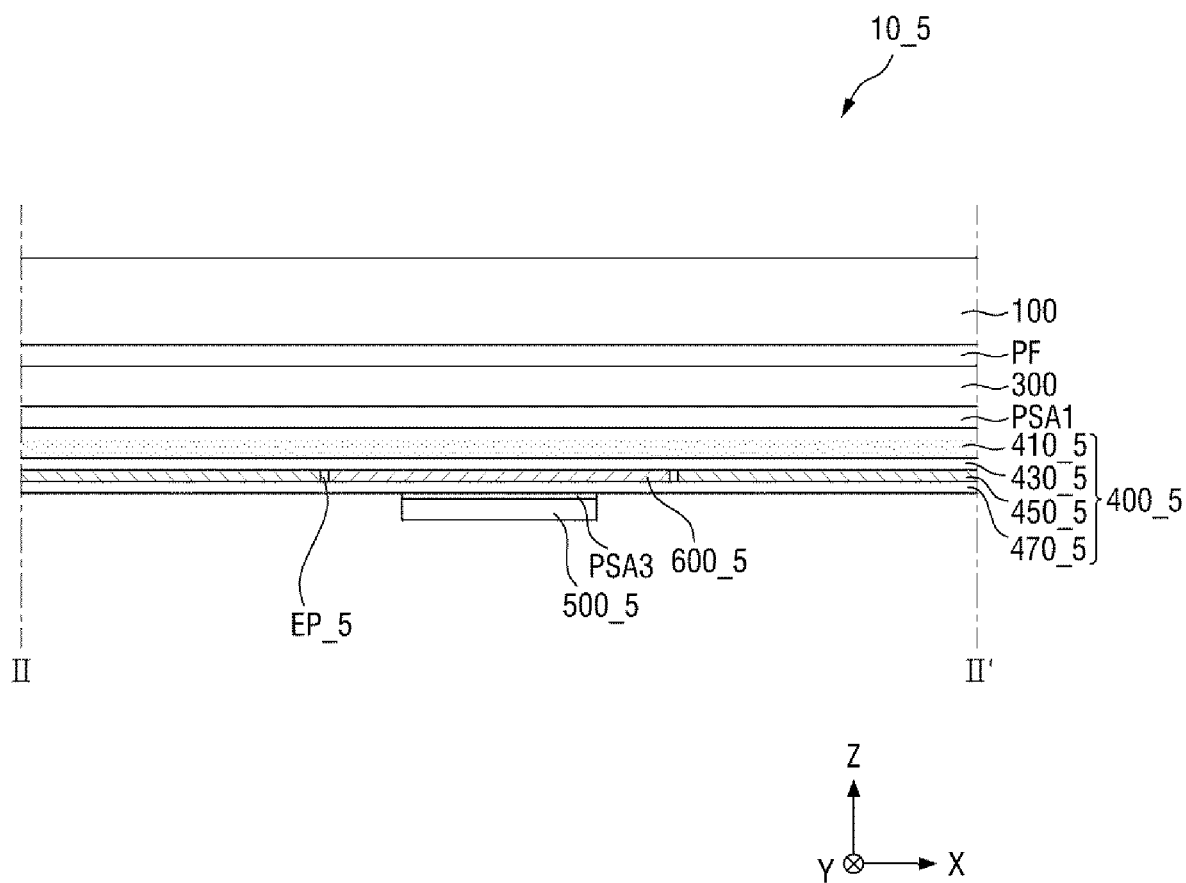

FIGS. 17 and 18 are cross-sectional views taken along line II-IF of FIG. 4, of display devices according to other exemplary embodiments of the present disclosure.

Referring to FIG. 17, a display device 10_4 may include a hole EP_4, which is formed in portion of a panel bottom member 400_4 and forms an empty space in an area that overlaps with a vibration transmitting member 600_4. FIG. 17 illustrates that the hole EP_4 of the panel bottom member 400_4 is disposed on the same plane as a shielding member 450_4 not to overlap with the vibration transmitting member 600_4 in the thickness direction, i.e., in a third direction (or a Z-axis direction). However, the present disclosure is not limited to this, and the hole EP_4 may be disposed in another layer of the panel bottom member 400_4 and may extend to another layer to become thicker than illustrated in FIG. 17. For example, the hole EP_4 may be disposed in portion of a buffer member 410_4 or a film layer 430_4 that overlaps with the vibration transmitting member 600_4 in the thickness direction. In another example, the hole EP_4 may be disposed in one of a first adhesive member PSA1 and a polarizing film PF.

Due to the presence of the hole EP_4, an empty space may be interposed between the vibration transmitting member 600_4 and the display panel 300. Since vibration transmitted by the vibration transmitting member 600_4 is delivered to the display panel 300 via the hole EP_4 of the panel bottom member 400_4, the rate of transmission of vibration can be improved as compared to when there exists another element disposed in the hole EP_4. Also, due to the presence of the hole EP_4, the shielding member 450_4 can be disposed not to overlap with the vibration transmitting member 600_4 in the thickness direction, and as a result, damage that may be caused by vibration transmitted by the vibration transmitting member 600_4 can be prevented or reduced.

Referring to FIG. 18, in a display device 10_5, a vibration transmitting member 600_5 may be disposed in a hole EP_5 which is formed in a panel bottom member 400_5. The vibration transmitting member 600_5 may be disposed in the same layer as a shielding member 450_5, and a heat dissipation member 470_5 and a third adhesive member PSA3 may be interposed between a vibration generating device 500_5 and the vibration transmitting member 600_5. That is, the distance between the vibration generating device 500_5 and the vibration transmitting member 600_5 may be widened.

In the display device 10_5 of FIG. 18, unlike in the display device 10_4 of FIG. 17, the vibration transmitting member 600_5 may be embedded in the panel bottom member 400_5. The vibration transmitting member 600_5 may be disposed in the same layer as the shielding member 450_5 of the panel bottom member 400_5, as illustrated in FIG. 7B. In this case, damage that may be caused by the vibration of the shielding member 450_5 can be prevented or reduced, and the distance between the vibration transmitting member 600_5 and a display panel 300 can be reduced. For example, the thickness of the vibration transmitting member 600_5 may range from 0.25 μm to 0.5 μm. The vibration transmitting member 600_5, which is disposed in the panel bottom member 400_5, may have an appropriate thickness not to considerably increase the thickness of the panel bottom member 400_5, but the present disclosure is not limited thereto.

Even though the heat dissipation member 470_5 is disposed between the vibration generating device 500_5 and the vibration transmitting member 600_5, vibration generated by the vibration generating device 500_5 can be properly transmitted to the vibration transmitting member 600_5 because the heat dissipation member 470_5 includes a metallic material such as Cu. Since in the display device 10_5 of FIG. 18, the vibration transmitting member 600_5 is embedded in the panel bottom member 400_5, the distance between the display panel 300 and the vibration transmitting member 600_5 can be reduced, and damage to the shielding member 450_5 can be prevented or reduced. However, the present disclosure is not limited to this, and the vibration transmitting member 600_5 may be disposed in another layer of the panel bottom member 400_5. For example, the vibration transmitting member 600_5 may be disposed in portion of a buffer member 410_4 or a film layer 430_4 that overlaps with the vibration transmitting member 600_4 in the thickness direction. In another example, the vibration transmitting member 600_5 may be disposed in one of a first adhesive member PSA1 and a polarizing film PF.

FIGS. 19, 20, 21, 22, and 23 are bottom views of display devices according to other exemplary embodiments of the present disclosure.

In the display device 10 of FIG. 4, the vibration generating device 500 and the vibration transmitting member 600 may be disposed adjacent to one side of the panel bottom member 400, e.g., the upper side of the panel bottom member 400, but the present disclosure is not limited thereto. That is, in order for the display device 10 to transmit vibration generated by the vibration generating device 500 throughout the entire surface of the display panel 300, the vibration transmitting member 600 may be disposed in a wider area.

Figure 19:
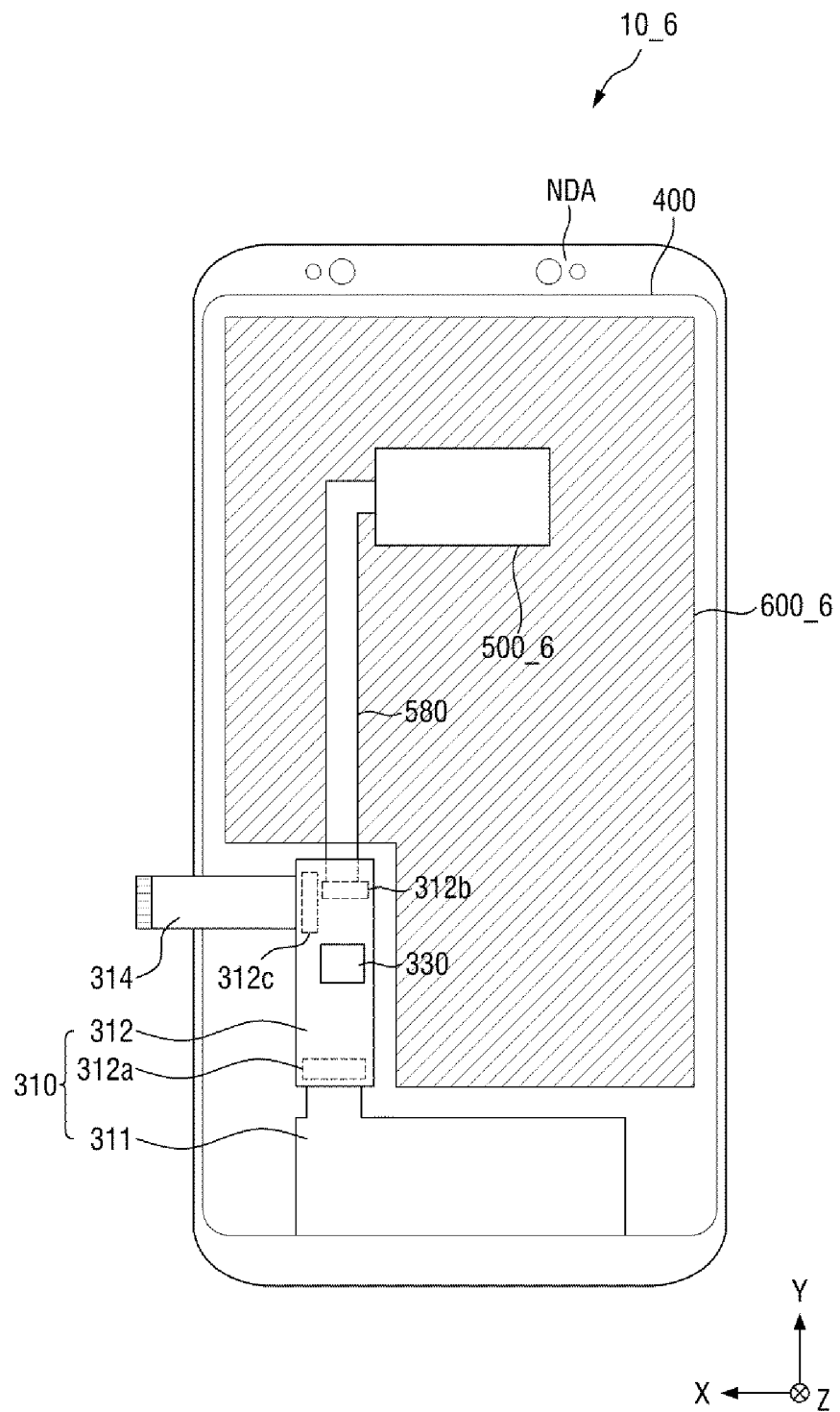
FIGS. 19, 20, 21, 22, and 23 are bottom views of display devices according to other exemplary embodiments of the present disclosure.

Referring to FIG. 19, in a display device 10_6, a vibration transmitting member 600_6 may be disposed on the entire surface of a panel bottom member 400, except for an area in which a display circuit board 310 is disposed. In the display device 10_6 of FIG. 19, the vibration transmitting member 600_6 may have a wider area than its counterpart of the display device 10 of FIG. 4. Also, the vibration transmitting member 600_6, unlike its counterpart of the display device 10 of FIG. 4, may be disposed to extend from the upper side to the lower side of the panel bottom member 400. However, since the vibration transmitting member 600_6 is disposed not to overlap with the display circuit board 310, the display circuit board 310 can be prevented or protected from being damaged by vibration. In this case, vibration generated by the vibration generating device 500_6 can be transmitted to a wider area over the display panel 300 through the vibration transmitting member 600_6. Accordingly, the area in the display device 10_6 where sound or a haptic effect is output can be widened.

However, the vibration transmitting member 600 includes a metallic material. Thus, as the area of the vibration transmitting member 600 increases, the load applied to the display device 10 or the display panel 300 may also increase. In this case, the vibration transmission rate of the vibration transmitting member 600 may decrease. For example, the vibration transmitting member 600 may be formed into a pattern capable of increasing the amount of vibration transmitted to the display panel 300.

Figure 20:
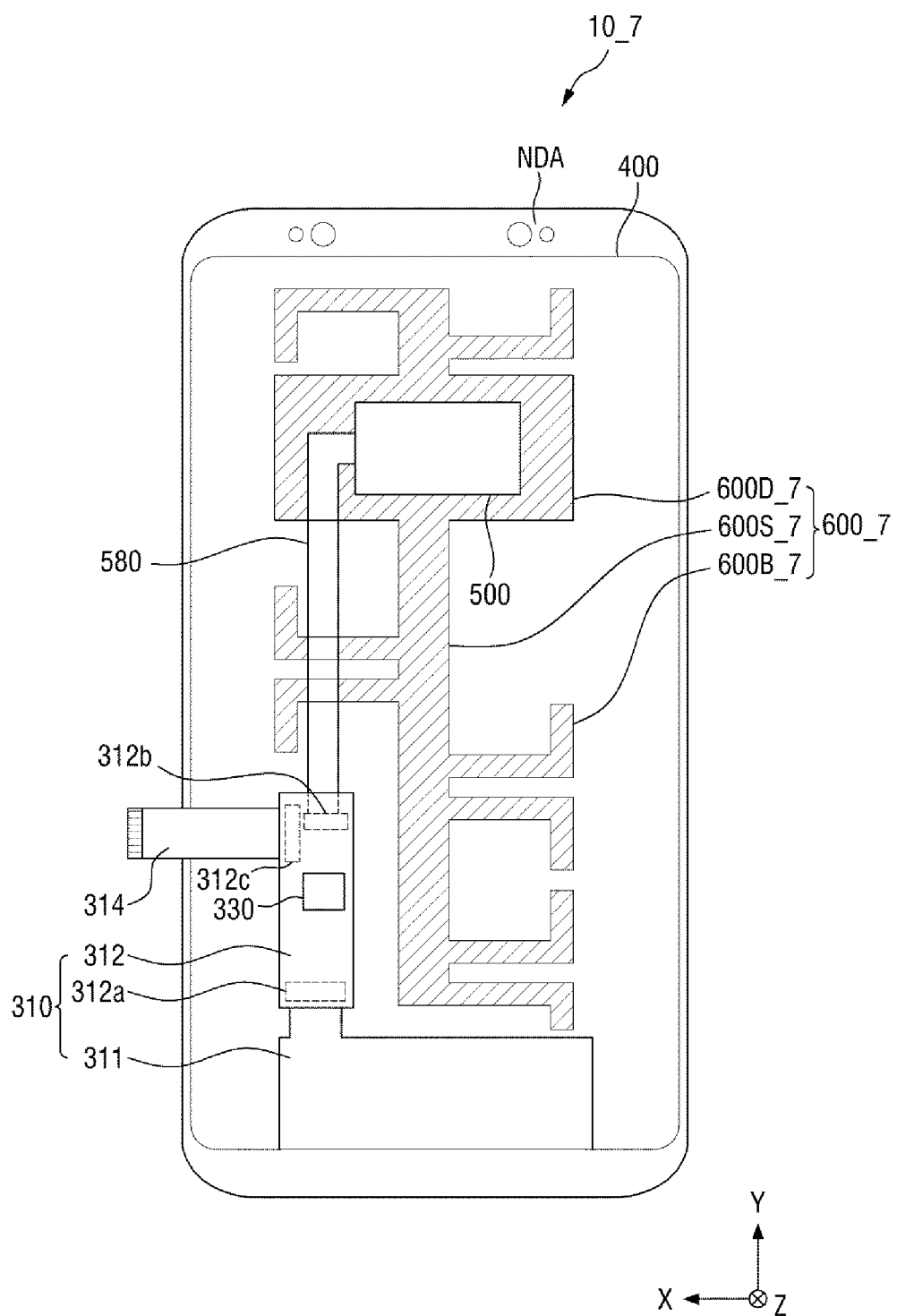

Referring to FIG. 20, a vibration transmitting member 600_7 of a display device 10_7 may include a body portion 600D_7 which is disposed to overlap with a vibration generating device 500, stem portions 600S_7 which are connected to the body portion 600D_7 and extends in one direction not to overlap with the vibration generating device 500, and branch portions 600B_7 which extend in the other direction to intersect the stem portions 600S_7 and branch off from the stem portions 600S_7.

The body portion 600D_7 of the vibration transmitting member 600_7 may be disposed to overlap with the vibration generating device 500 and may thus receive vibration generated by the vibration generating device 500. At least some of the vibration transmitted to the body portion 600D_7 may be delivered directly to a display panel 300, and some of the vibration transmitted to the body portion 600D_7 may be delivered to the display panel 300 through the stem portions 600S_7 and the branch portions 600B_7.

The stem portions 600S_7 may be connected to the body portion 600D_7 and may extend in, for example, a second direction (or a Y-axis direction). The stem portions 600S_7 may extend from the upper and lower sides of the body portion 600D_7 and may be terminated at a distance from the upper side of a panel bottom member 400 or from a first circuit board 311, but the present disclosure is not limited thereto. The number of stem portions 600S_7 is not particularly limited. The stem portion 600S_7, which extend from the upper and lower sides of the body portion 600D_7, may transmit vibration generated by the vibration generating device 500 to the upper and lower sides of the display panel 300, thereby outputting sound or a haptic feedback.

The branch portions 600B_7 may branch off from the stem portions 600S_7 in, for example, a first direction (or an X-axis direction). FIG. 20 illustrates that the branch portions 600B_7 branch off in a straight line from the stem portions 600S_7, but the present disclosure is not limited thereto. The branch portions 600B_7 may have various structures to be able to properly transmit the vibration of the vibration generating device 500 to the display panel 300. The branch portions 600B_7 may extend from the left and right sides of the panel bottom member 400 and may thus transmit vibration generated by the vibration generating device 500 to the left and right sides of the display panel 300, thereby outputting sound or a haptic feedback.

The shape of the vibration transmitting member 600_7 of FIG. 20 is exemplary, and the present disclosure is not limited thereto. The numbers of stem portions 600S_7 and branch portions 600B_7 provided in the vibration transmitting member 600_7 are not particularly limited, and the stem portions 600S_7 and the branch portions 600B_7 may extend in various shapes other than a straight line.

Figure 21:
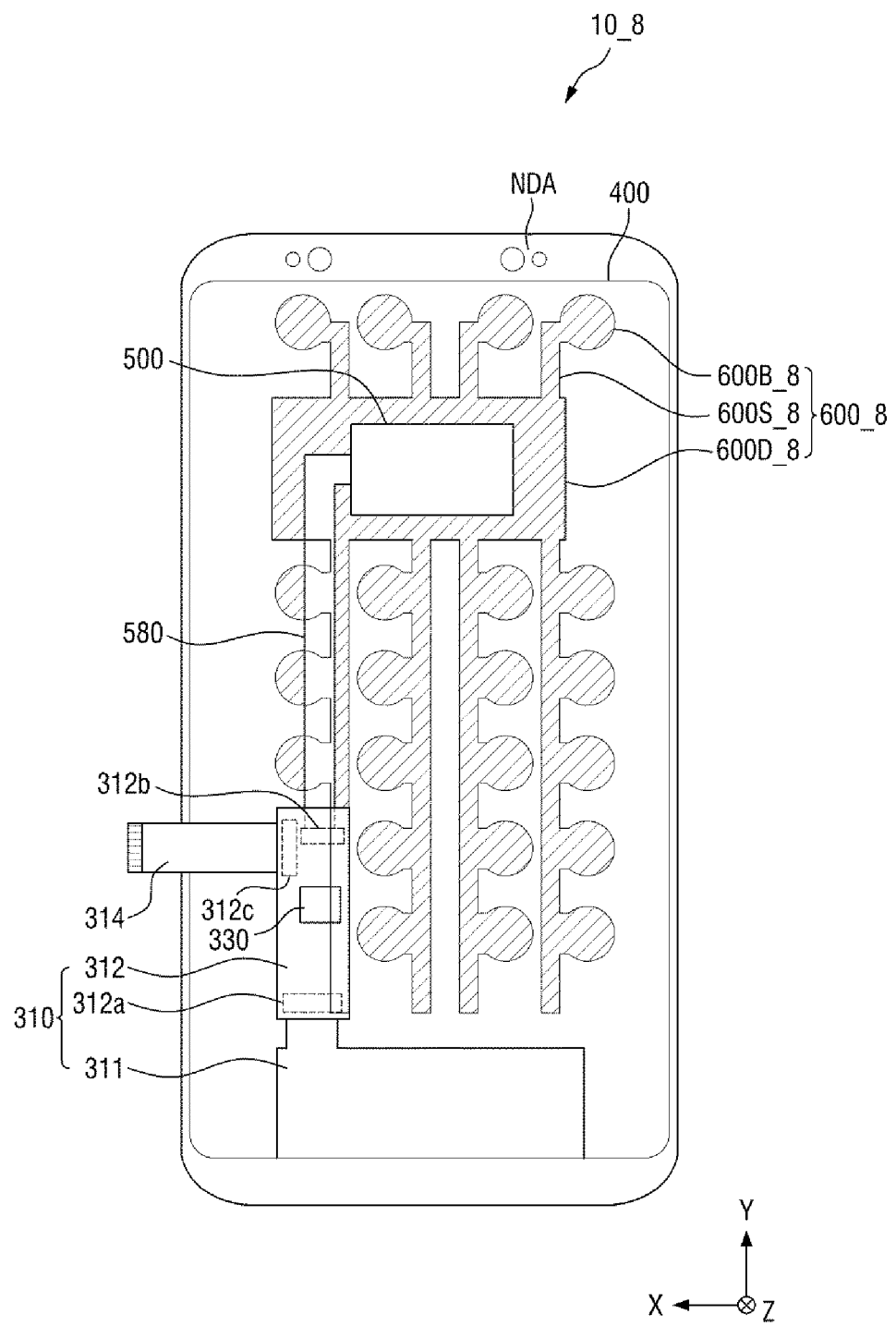

Referring to FIG. 21, a vibration transmitting member 600_8 of a display device 10_8 may include more stem portions 600S_8 than the vibration transmitting member 600_7 of FIG. 20, and branch portions 600B_8 of the vibration transmitting member 600_8 may protrude from sides of the stem portions 600S_8 and may have a circular shape. The display device 10_8 of FIG. 21 is the same as the display device 10_7 of FIG. 20, except for the shapes of the stem portions 600S_8 and the branch portions 600B_8 of the vibration transmitting member 600_8. The shape of the vibration transmitting member 600_8 is not particularly limited as long as the vibration transmitting member 600_8 can transmit the vibration of a vibration generating device 500 throughout the entire surface of a display panel 300. For example, the sizes of portions of the vibration transmitting member 600_8 may increase away from the vibration generating device 500. That is, as illustrated in FIG. 21, the diameter of a branch portion 600B_8 adjacent to the vibration generating device 500 may be greater than the diameter of a branch portion 600B_8 apart from the vibration generating device 500. Although not specifically illustrated, a patterned vibration transmitting member 600, like the vibration transmitting member 600_7 or 600_8 of FIG. 20 or 21, may also be applicable to the exemplary embodiments of FIGS. 14, 15, 16, 17, and 18. For example, the patterned vibration transmitting member 600 may be disposed in any one of the buffer member 410, the film layer 430, the shielding member 450, and the heat dissipation member 470. Embodiments in which the patterned vibration transmitting member 600 is disposed in the buffer member 410, the film layer 430, the shielding member 450, or the heat dissipation member 470 are substantially as already described above, and thus, detailed descriptions thereof will be omitted.

Figure 22:
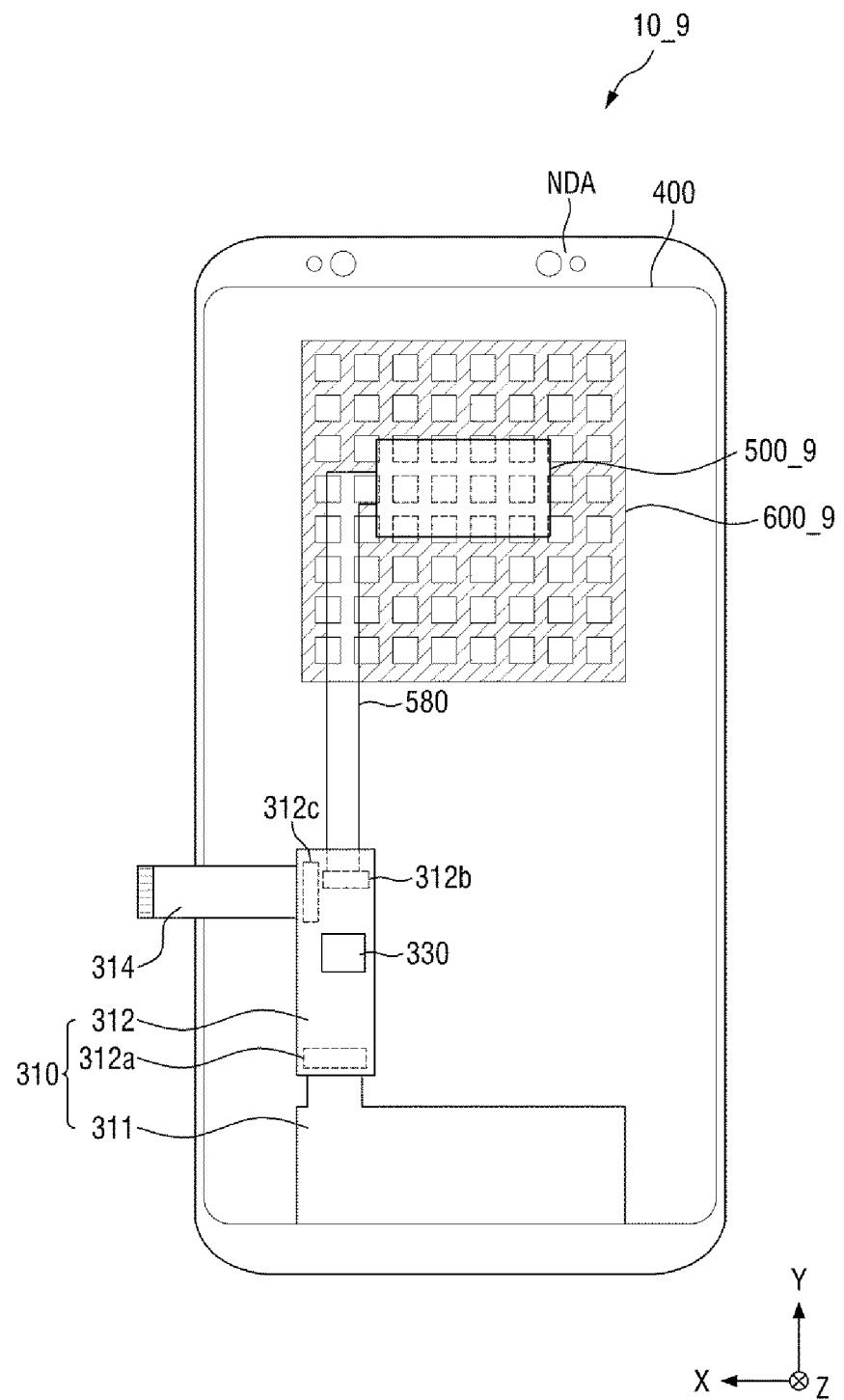
Figure 23:
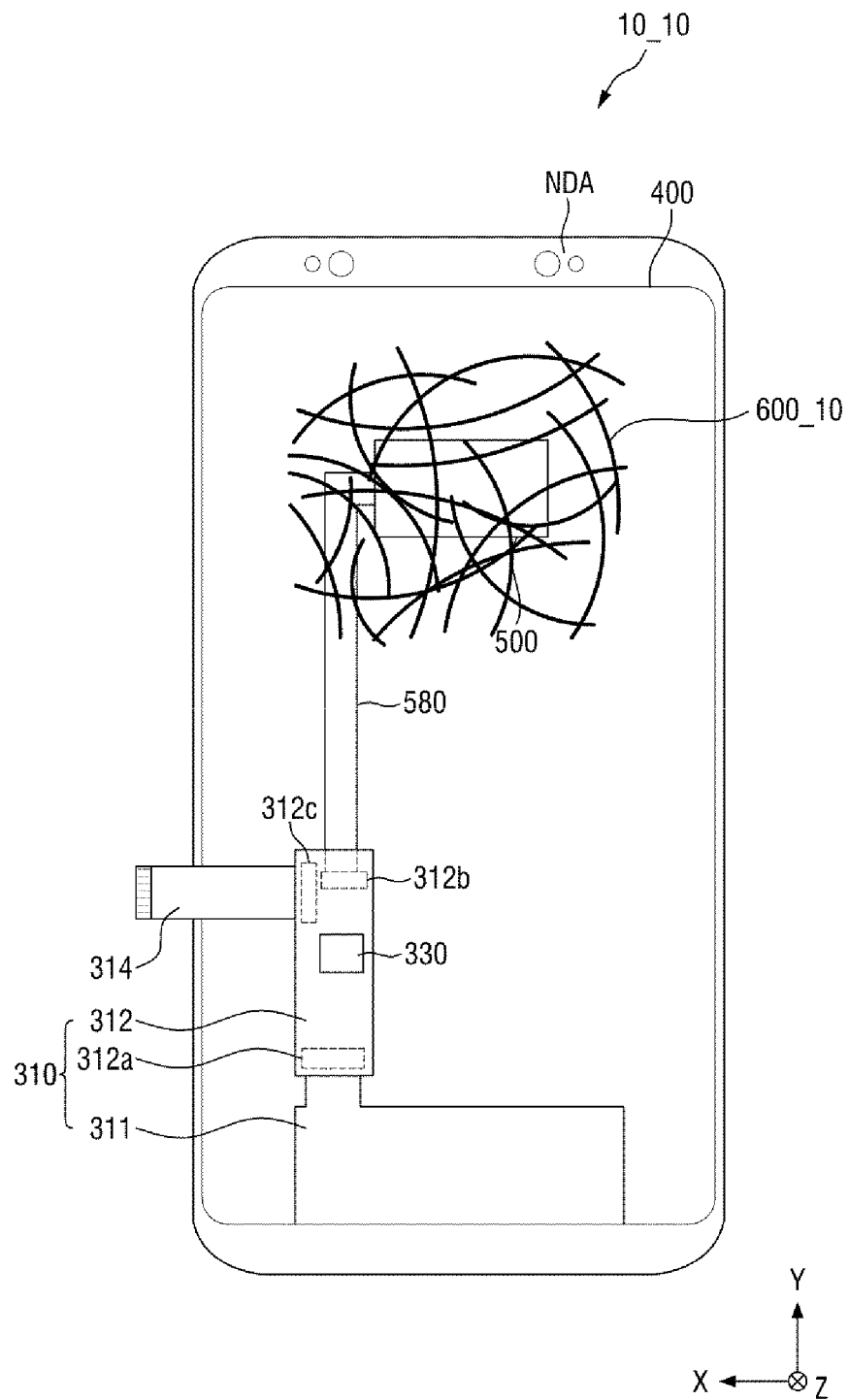

Alternatively to what is illustrated in FIG. 4, the vibration transmitting member 600 may not necessarily be formed as a metal plate. Referring to FIGS. 22 and 23, a vibration transmitting member 600_9 may be formed into a mesh shape, and a vibration transmitting member 600_10 may be formed into in which multiple wires are scattered.

In the exemplary embodiments of FIGS. 22 and 23, a vibration generating device 500_9 or 500_10 may include portions that do not overlap with the vibration transmitting member 600_9 or 600_10.

Figure 24:
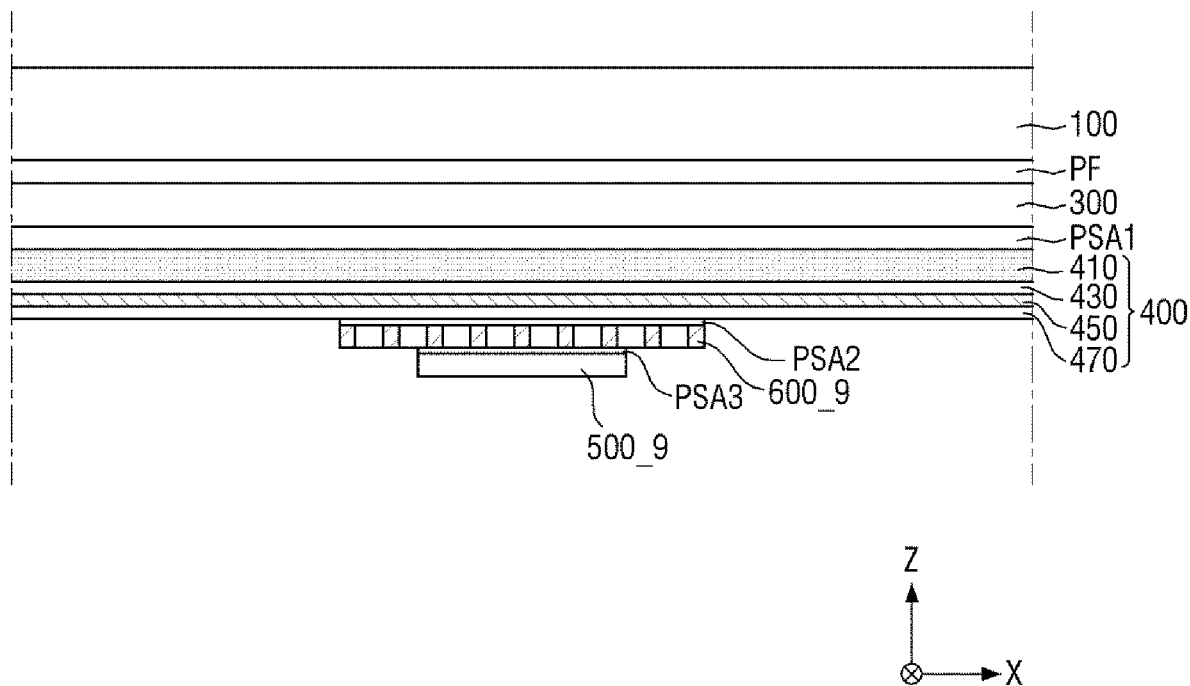
FIG. 24 is a cross-sectional view illustrating part of the display device of FIG. 22.

FIG. 24 is a cross-sectional view illustrating part of the display device of FIG. 22.

Referring to FIG. 24, since the vibration transmitting member 600_9 is in a mesh shape or a shape in which multiple wires are scattered, portions of the vibration transmitting member 600_9 may be spaced apart from one another with spaces or gaps formed therebetween. The vibration generating device 500_9 may be disposed on the vibration transmitting member 600_9 and may include portions that overlap with the portions of the vibration transmitting member 600_9 and portions that overlap with the spaces or gaps formed between the portions of the vibration transmitting member 600_9.

The vibration transmitting member 600 may have a metallic material and may thus have a large modulus. Since the vibration transmitting members 600_9 and 600_10 are formed into a mesh shape or as a group of wires, the vibration transmitting members 600_9 and 600_10 can lower the modulus while maintaining the rate of transmission of vibration. Accordingly, even if the vibration transmitting member 600 is disposed in a wide area over the panel bottom member 400, the vibration transmitting member 600 or elements adjacent to the vibration transmitting member 600 can be prevented or protected from being damaged in the process of bonding multiple members during the fabrication of the display device 10. However, the present disclosure is not limited to this.

Figure 25:
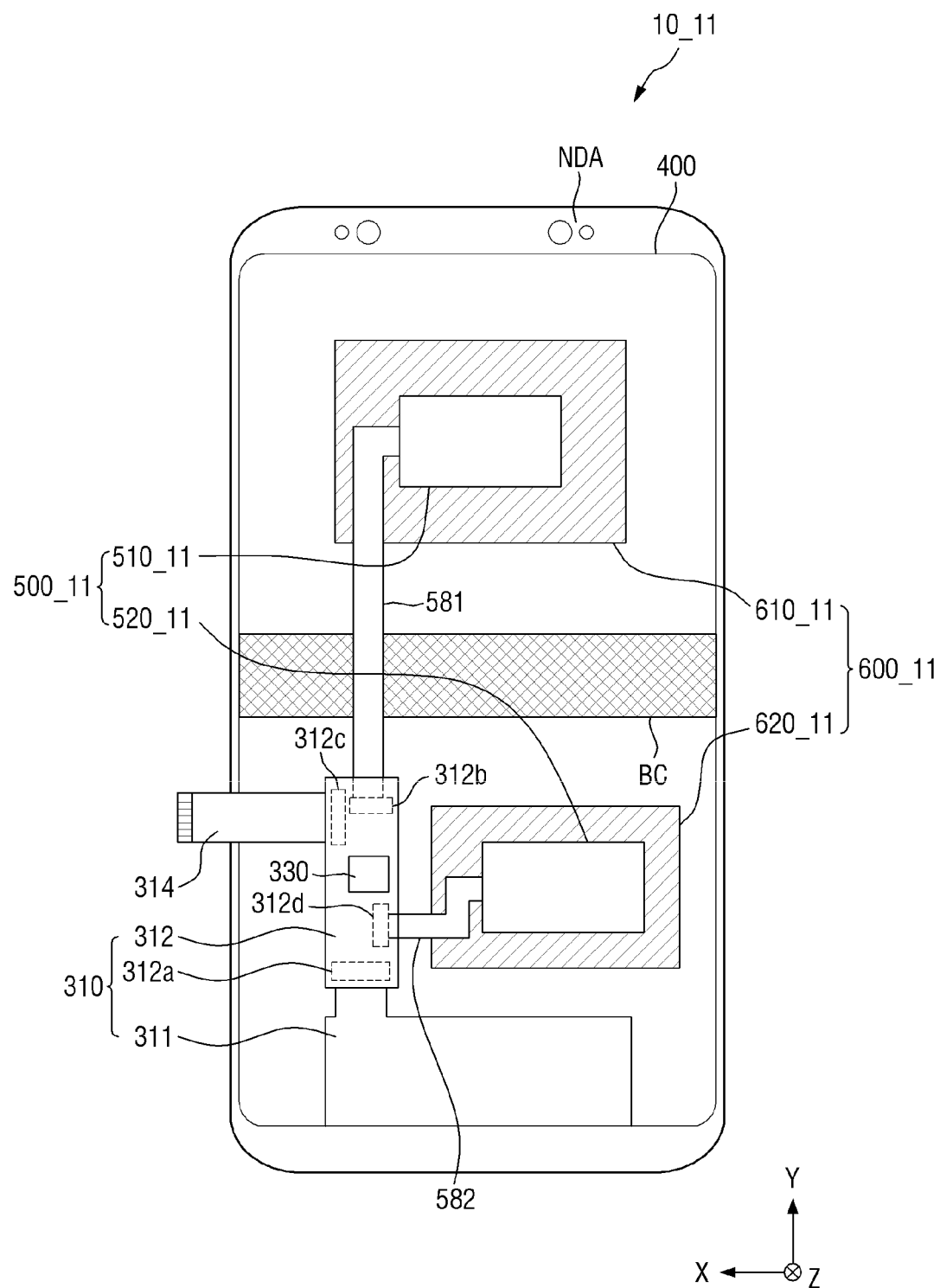
FIG. 25 is a bottom view of a display device according to another exemplary embodiment of the present disclosure.

FIG. 25 is a bottom view of a display device according to another exemplary embodiment of the present disclosure.

Referring to FIG. 25, a display device 10_11 may include a plurality of vibration generating devices 500_11 and a plurality of vibration transmitting members 600_11 and may further include a blocking member BC which is disposed between the vibration generating devices 500_11 and between the vibration transmitting members 600_11.

The display device 10_11 of FIG. 25 differs from the display device 10 of FIG. 4 in that it includes more than one vibration generating device 500_11 and more than one vibration transmitting member 600_11 and further includes the blocking member BC. The display device 10_11 of FIG. 25 will hereinafter be described, focusing mainly on the differences with the display device 10 of FIG. 4.

Referring to FIG. 25, the display device 10_11 may include first and second vibration generating devices 510_11 and 520_11 and first and second vibration transmitting members 610_11 and 620_11. The first and second vibration generating devices 510_11 and 520_11 may be attached to the bottom surface of a panel bottom member 400 via adhesive members. The first and second vibration transmitting members 610_11 and 620_11 may be disposed to at least partially overlap with the first and second vibration generating devices 510_11 and 520_11, respectively. The first and second vibration transmitting members 610_11 and 620_11 may be disposed between a display panel 300 and the vibration generating device 500_11. The first and second vibration transmitting members 610_11 and 620_11 may be disposed on the bottom surface of the panel bottom member 400 or may be embedded in the panel bottom member 400.

For example, the first vibration generating device 510_11 and the first vibration transmitting member 610_11 may be disposed adjacent to one side, e.g., the upper side of the panel bottom member 400, and the second vibration generating device 520_11 and the second vibration transmitting member 620_11 may be disposed adjacent to the other side, e.g., the lower side of the panel bottom member 400. Accordingly, the second vibration generating device 520_11 and the second vibration transmitting member 620_11 may be disposed closer than the first vibration generating device 510_11 and the first vibration transmitting member 610_11 to a second circuit board 312. The first vibration generating device 510_11 may be electrically connected to the second circuit board 312 via a first FPCB 581 and a second connector 312b, and the second vibration generating device 520_11 may be electrically connected to the second circuit board 312 via a second FPCB 582 and a fourth connector 312d. A sound driving unit 330 may apply driving voltages to the first and second vibration generating devices 510_11 and 520_11 via the first and second FPCB 581 and 582, respectively.

The first vibration generating device 510_11 and the first vibration transmitting member 610_11 are substantially the same as the vibration generating device 500 and the vibration transmitting member 600, respectively, of FIG. 4, and thus, the second vibration generating device 520_11 and the second vibration transmitting member 620_11 will hereinafter be described.

The second vibration generating device 520_11 may include a second vibration layer which contracts or expands in accordance with driving voltages applied by the sound driving unit 330. In this case, in a case where the second vibration generating device 520_11 vibrates within a first frequency range, the display panel 300 can be vibrated by the second vibration generating device 520_11, and as a result, second sound can be output. In a case where the second vibration generating device 520_11 vibrates within a second frequency range, a haptic feedback can be provided by the vibration of the second vibration generating device 520_11.

The vibration of the second vibration generating device 520_11 may be transmitted to the display panel 300 via the second vibration transmitting member 620_11. The second vibration transmitting member 620_11, like the first vibration transmitting member 610_11, may include a metallic material with a large modulus and may have a larger width in first and second directions (or X- and Y-axis directions) than the second vibration generating device 520_11.

In a sound mode, the fundamental frequency (F0) of first sound output via the vibration of the display panel 300 by the first vibration generating device 510_11 may be higher than the fundamental frequency (F0) of second sound output via the vibration of the display panel 300 by the second vibration generating device 520_11.

Also, in the sound mode, first stereo sound may be output by vibrating the display panel 300 via the first vibration generating device 510_11, and second stereo sound may be output by vibrating the display panel 300 via the second vibration generating device 520_11. In this case, a user can be provided with 2.0 channels of stereo sound. In order to provide high-quality stereo sound to the user, the first vibration generating device 510_11 may be disposed adjacent to the upper side of the display panel 300, and the second vibration generating device 520_11 may be disposed adjacent to the lower side of the display panel 300.

Also, in a haptic mode, a haptic feedback may be provided by vibrating both the first and second vibration generating devices 510_11 and 520_11 or only the second vibration generating device 520_11. Alternatively, in the haptic mode, a first haptic feedback may be provided by vibrating the first vibration generating device 510_11, a second haptic feedback may be provided by vibrating the second vibration generating device 520_11, and the vibration magnitude of the second haptic feedback may be greater than the vibration magnitude of the first haptic feedback. However, the present disclosure is not limited to these examples.

The blocking member BC may be disposed in the gap between the first and second vibration generating devices 510_11 and 520_11 or between the first and second vibration transmitting members 610_11 and 620_11. The blocking member BC may be attached to the bottom surface of the panel bottom member 400 or may be disposed in substantially the same layer as the vibration transmitting member 600_11. The blocking member BC may be disposed near the center of the display panel 300 and may extend in the first direction (or the X-axis direction).

The blocking member BC may block the transmission of the first sound or the first haptic feedback generated by the first vibration generating device 510_11 via the first vibration transmitting member 610_11 to the second vibration generating device 520_11 and the second vibration transmitting member 620_11. Also, the blocking member BC may block the transmission of the second sound or the second haptic feedback generated by the second vibration generating device 520_11 via the second vibration transmitting member 620_11 to the first vibration generating device 510_11 and the first vibration transmitting member 610_11. Accordingly, the first sound and the first haptic effect can be output to the display device 10 via the display panel 300 without being interfered with by the second sound and the second haptic feedback, and vice versa.

Although not specifically illustrated, the blocking member BC may be formed as a multilayer film including a buffer layer. The buffer layer may be formed of foam with elasticity and may block the transmission of vibration generated and transmitted by the vibration generating devices 500_11 and the vibration transmitting members 600_11. For example, the buffer layer of the blocking member BC may be formed of polyurethane, silicone, rubber, or aerogel, but the present disclosure is not limited thereto.

The blocking member BC may not be formed as a separate element, but may be formed as portion of the vibration transmitting members 600_11 by patterning the vibration transmitting members 600.

Figure 26:
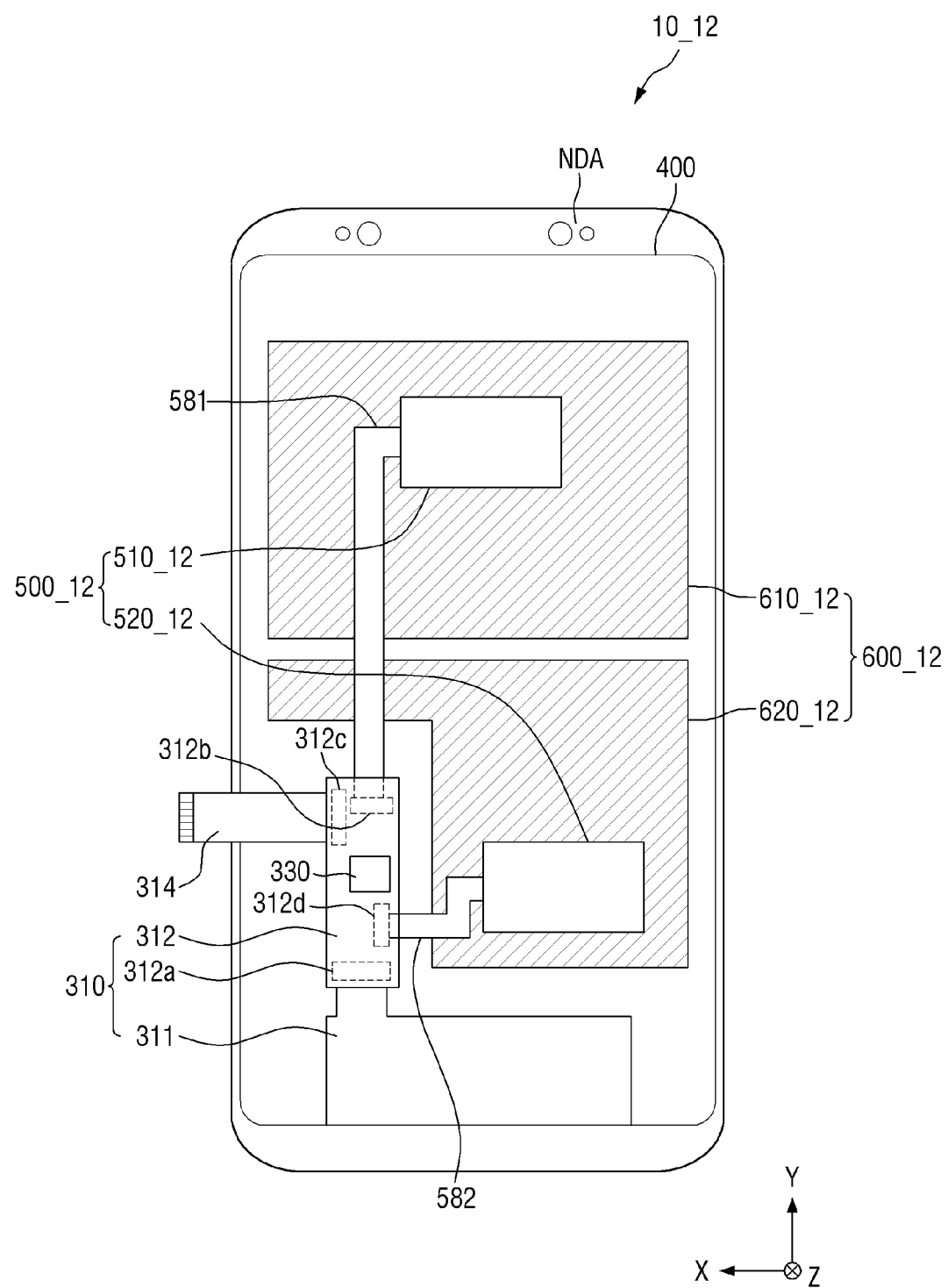
FIG. 26 is a bottom view of a display device according to another exemplary embodiment of the present disclosure.

FIG. 26 is a bottom view of a display device according to another exemplary embodiment of the present disclosure.

Referring to FIG. 26, a display device 10_12 may include a first vibration transmitting member 610_12 and a second vibration transmitting member 620_12 which are spaced apart from each other, and no blocking member BC may be disposed between the first and second vibration transmitting members 610_12 and 620_12. The display device 10_12 of FIG. 26 differs from the display device 10_11 of FIG. 25 in that no blocking member BC is disposed between the first and second vibration transmitting members 610_12 and 620_12.

In the exemplary embodiment of FIG. 25, the blocking member BC may be disposed between the first and second vibration transmitting members 610_11 and 620_11 to prevent or suppress the transmission of a haptic feedback or sound between the first and second vibration generating devices 510_11 and 520_11. However, the blocking member BC may not necessarily be disposed between the first and second vibration transmitting members 610_11 and 620_11. As illustrated in FIG. 26, the first and second vibration transmitting members 610_12 and 620_12 may be spaced apart from each other so that the space formed therebetween may perform the same functions as the blocking member BC. In this case, no blocking member BC may be disposed between the between the first and second vibration transmitting members 610_12 and 620_12. A further detailed description of the display device 10_12 will be omitted.

Meanwhile, the vibration generating device 500 may not necessarily be a piezoelectric actuator and may include a device other than a piezoelectric actuator. For example, the vibration generating device 500 may be an exciter that vibrates the display panel 300 by generating a magnetic force with a voice coil.

Figure 27:
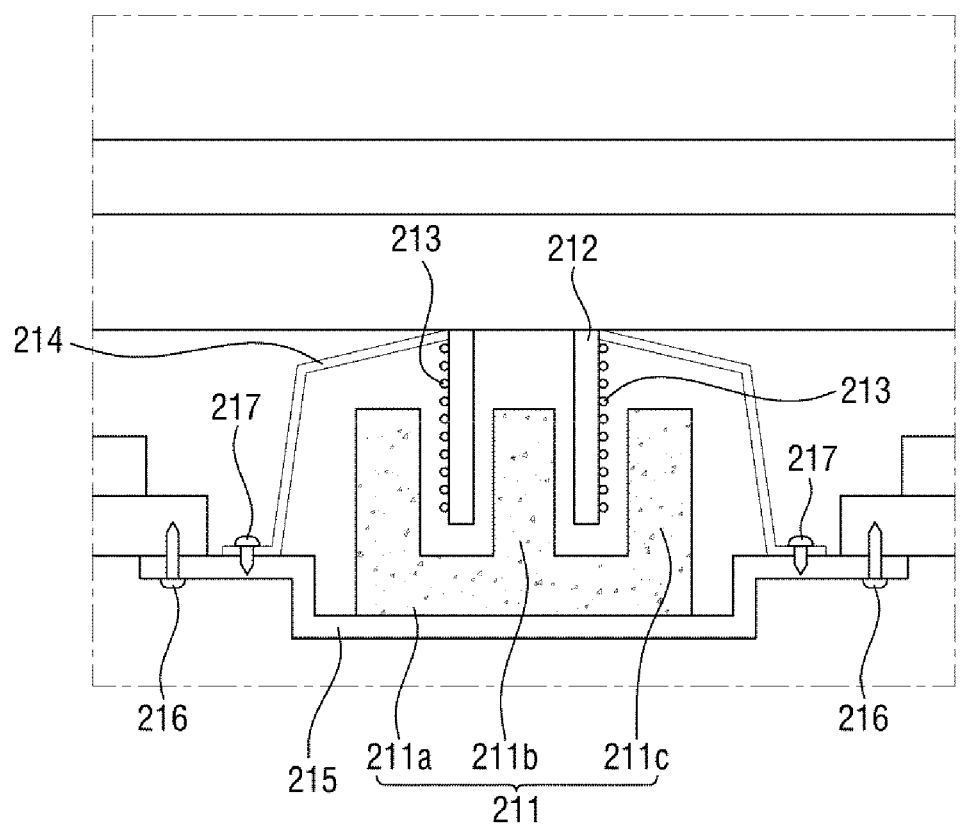
FIG. 27 is a cross-sectional view of a vibration generating device according to another exemplary embodiment of the present disclosure.
Figure 28A:
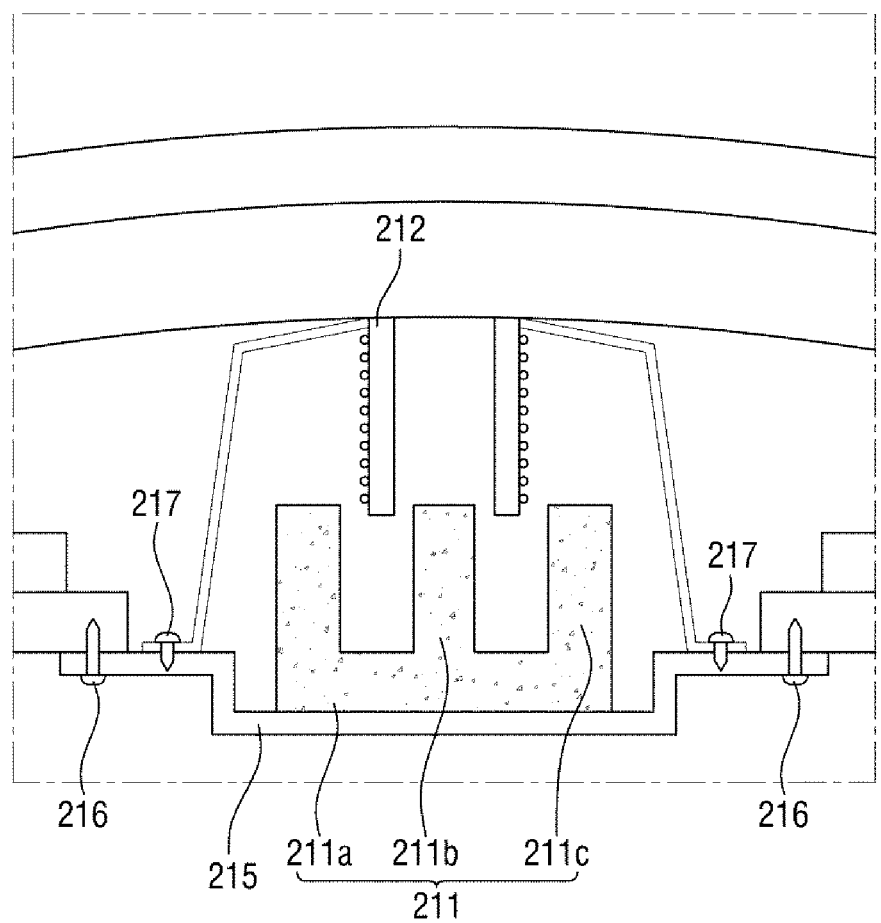
FIGS. 28A and 28B are cross-sectional views illustrating how the vibration generating device of FIG. 27 vibrates a display panel.
Figure 28B:
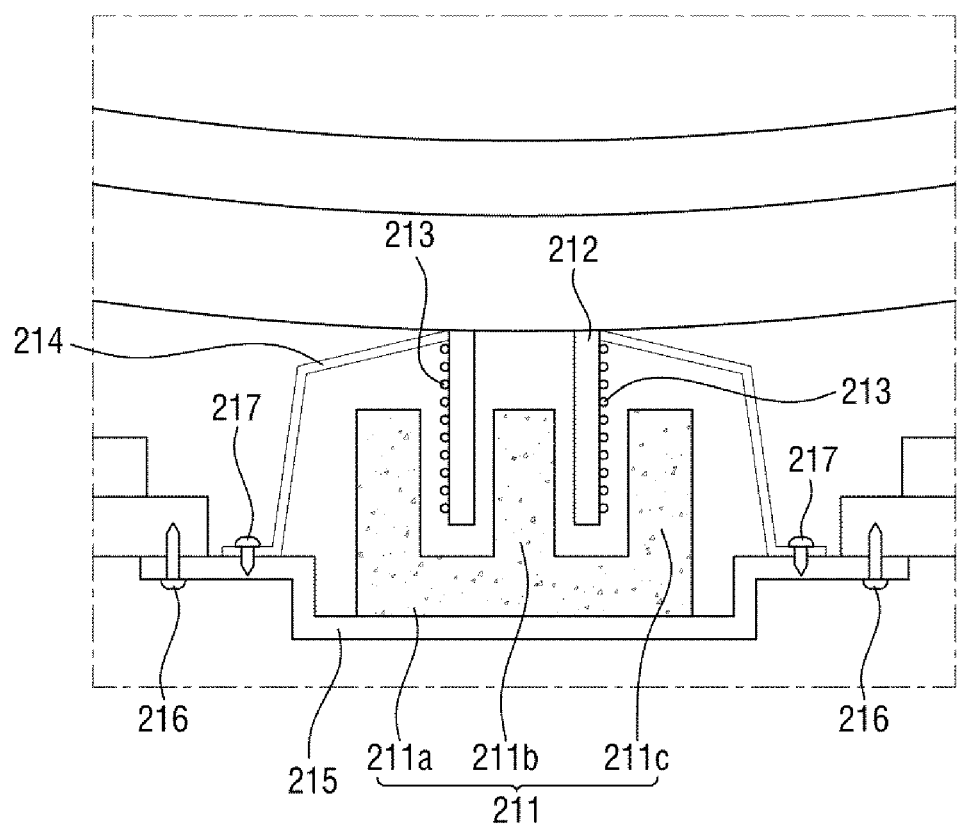

FIG. 27 is a cross-sectional view of a vibration generating device according to another exemplary embodiment of the present disclosure. FIGS. 28A and 28B are cross-sectional views illustrating how a display panel is vibrated by the vibration generating device of FIG. 27.

Referring to FIGS. 27, 28A, and 28B, a vibration generating device 500 includes a magnet 211, a bobbin 212, a voice coil 213, a damper 214, a plate 215, first fixing members 216, second fixing members 217, and a connecting member.

The magnet 211 may be a permanent magnet, and a sintered magnet such as a barium ferrite magnet may be used. The magnet 211 may be formed as a ferric trioxide ($Fe_2O_3$) magnet, a barium carbonate ($BaCO_3$) magnet, a Nd magnet, a strontium ferrite magnet with an improved magnetic component, or an Al, Ni, or cobalt (Co) cast alloy magnet, but the present disclosure is not limited thereto. The Nd magnet may be, for example, a neodymium-iron-boron (Nd—Fe—B) magnet.

The magnet 211 may include a flat portion 211a, a central protruding portion 211b protruding from the center of the flat portion 211a, and a sidewall portion 211c protruding from the edge of the flat portion 211a. The central protruding portion 211b and the sidewall portion 211c may be a predetermined distance from each other, and as a result, a predetermined space may be formed between the central protruding portion 211b and the sidewall portion 211c.

The central protruding portion 211b of the magnet 211 may have N-pole magnetism, and the flat portion 211a and the sidewall portion 211c may have S-pole magnetism. As a result, an external magnetic field may be formed between the central protruding portion 211b and the flat portion 211a of the magnet 211 and between the central protruding portion 211b and the sidewall portion 211c of the magnet 211.

The bobbin 212 may be formed into a cylindrical shape. The central protruding portion 211b of the magnet 211 may be disposed in the bobbin 212, and the bobbin 212 may be disposed to surround the central protruding portion 211b of the magnet 211. The sidewall portion 211c of the magnet 211 may be disposed on the outside of the bobbin 212. That is, the sidewall portion 211c of the magnet 211 may be disposed to surround the bobbin 212. Spaces may be formed between the bobbin 212 and the central protruding portion 211b of the magnet 211 and between the bobbin 212 and the sidewall portion 211c of the magnet 211.

The bobbin 212 may be formed of a pulp- or paper-processed material, Al, Mg, or an alloy thereof, a synthetic resin such as polypropylene, or polyamide-based fibers.

The voice coil 213 is wound around the outer circumferential surface of the bobbin 212. The voice coil 213 may be connected to a connecting terminal to receive driving voltages, e.g., 1A-th and 2A-th driving voltages, from the sound driving unit 330.

The damper 214 is disposed between the bobbin 212 and the plate 215. The damper 214 may be disposed to surround the bobbin 212 may be fixed to the plate 215 via the second fixing members 217 such as screws.

The second fixing members 217 may be inserted and fixed in holes formed in the damper 214 and fixing holes formed in the plate 215. The holes of the damper 214 and the fixing holes of the plate 215 may be screw holes into which screws can be fastened.

The damper 214 may have elasticity and may be formed of a conductive material. The damper 214 may control the vertical vibration of the bobbin 212 while contracting or expanding in accordance with the vertical movement of the bobbin 212. That is, since the damper 214 is connected to the bobbin 212 and the plate 215, the vertical movement of the bobbin 212 may be limited by the restoring force of the damper 214. For example, if the bobbin 212 vibrates beyond or below a predetermined height, the bobbin 212 can return to its original location due to the restoring force of the damper 214.

The plate 215 may be disposed on the bottom surface of the magnet 211. The plate 215 may be formed in one integral body with the magnet 211 or may be formed as a separate element from the magnet 211. The plate 215 may be fixed via the first fixing members 216.

Since one end of the voice coil 213 is electrically connected to the sound driving unit 330 via the first sound wire WL1, the voice coil 213 can receive the 1A-th driving voltage from the sound driving unit 330. Also, since the other end of the voice coil 213 is electrically connected to the sound driving unit 330, the voice coil 213 can receive the 2A-th driving voltage from the sound driving unit 330. A current may flow in the voice coil 213 in accordance with the 1A-th or 2A-th driving voltage. An applied magnetic field may be formed around the voice coil 213 depending on the current that flows in the voice coil 213. That is, the direction of the current that flows in the voice coil 213 when the first driving voltage is a positive voltage and the second driving voltage is a negative voltage may be opposite to the direction of the current that flows in the voice coil 213 when the first driving voltage is a negative voltage and the second driving voltage is a positive voltage. As the first and 2A-th driving voltages are alternately driven, the N pole and the S pole of the applied magnetic field may be changed so that an attracting force and a repulsive force can be alternately acted upon the magnet 211 and the voice coil 213. Accordingly, as illustrated in FIGS. 28A and 28B, the bobbin 212 having the voice coil 213 wound therearound can reciprocate in a third direction (or a Z-axis direction). Therefore, the display panel 300 can vibrate in the third direction (or the Z-axis direction), and as a result, sound can be output.

According to the exemplary embodiments of the present disclosure, a display device includes a vibration generating device, and a vibration transmitting member disposed to overlap with the vibration generating device. The vibration transmitting member may transmit vibration generated by the vibration generating device to a display panel, thereby minimizing loss of vibration when transmitting the vibration to the display panel through a panel bottom member. Accordingly, the generated sound may have increased sound pressure.

Therefore, the display device can improve the intensity of sound or haptic feedback generated by the vibration generating device.

Although certain exemplary embodiments and implementations have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A display device comprising:
    a display panel;
    a vibration generating device disposed on one surface of the display panel, the vibration generating device configured to generate vibration to be transmitted to the display panel;
    a panel bottom member disposed between the display panel and the vibration generating device;
    a vibration transmitting member disposed in the panel bottom member to at least partially overlap with the vibration generating device in plan view; and
    a first adhesive member disposed between the display panel and the panel bottom member, wherein the panel bottom member comprises a buffer member, a film layer, a shielding member, and a heat dissipation member and wherein the buffer member, the film layer, the shielding member, and the heat dissipation member are laminated in a thickness direction.

2. The display device of claim 1, wherein at least some of the vibration generated by the vibration generating device is transmitted to the display panel via the vibration transmitting member.

3. The display device of claim 2, wherein the vibration transmitting member comprises a metallic material.

4. The display device of claim 3, wherein the vibration generating device comprises:
a first electrode configured to receive a first driving voltage;
a second electrode configured to receive a second driving voltage; and
a first vibration layer disposed between the first and second electrodes, the first vibration layer is configured to contract and expand in accordance with the first and second driving voltages.

5. The display device of claim 1, further comprising: wherein:
the buffer member is disposed on one surface of the first adhesive member;
the film layer is disposed on one surface of the buffer member;
the shielding member is disposed on one surface of the film layer; and
the heat dissipation member is disposed on one surface of the shielding member.

6. The display device of claim 5, wherein the panel bottom member comprises a hole defining an empty space in at least portion of the shielding member, the hole being disposed overlapping with the vibration transmitting member in plan view.

7. The display device of claim 6, wherein the vibration transmitting member is disposed in the hole, and
wherein the vibration generating device is disposed below the heat dissipation member.

8. The display device of claim 7, wherein the vibration transmitting member has a thickness of 25 μm to 50 μm.

9. The display device of claim 6, wherein the vibration transmitting member is disposed below the heat dissipation member to overlap with the hole in plan view, and
wherein the vibration generating device is disposed below the vibration transmitting member.

10. The display device of claim 5, wherein the panel bottom member comprises an opening which exposes at least part of the film layer, and
wherein the vibration transmitting member is disposed on the exposed part of the film layer.

11. The display device of claim 10, further comprising:
a second adhesive member disposed between the vibration transmitting member and the film layer; and
a third adhesive member disposed between the vibration generating device and the vibration transmitting member.

12. A display device comprising:
a display panel;
a panel bottom member disposed below the display panel;
a first vibration generating device disposed below the panel bottom member, the first vibration generating device configured to generate vibration in response to receiving driving voltages;
a display circuit board disposed below the panel bottom member; and
a flexible printed circuit board electrically connecting the first vibration generating device and the display circuit board,
wherein the panel bottom member comprises a first vibration transmitting member configured to transmit the vibration to the display panel, the first vibration transmitting member disposed to at least partially overlap with the first vibration generating device in plan view,
wherein a width of the first vibration transmitting member in a first direction is greater than a width of the first vibration generating device in the first direction, and
wherein a length of the first vibration transmitting member in a second direction that intersects the first direction is greater than a length of the first vibration generating device in the second direction.

13. The display device of claim 12, wherein the first vibration transmitting member comprises:
a body portion disposed to overlap with the first vibration generating device in plan view;
stem portions connected to the body portion and extending in the first direction not to overlap with the first vibration generating device in plan view; and
branch portions branching off in the second direction from the stem portions.

14. The display device of claim 12, wherein the first vibration transmitting member has a mesh structure.

15. The display device of claim 12, wherein the display circuit board comprises a sound driving unit configured to output first and second driving voltages to the first vibration generating device, and
wherein the first vibration generating device comprises a vibration layer configured to contract and expand in accordance with the first and second driving voltages.

16. The display device of claim 12, further comprising a second vibration generating device disposed below the panel bottom member to be spaced apart from the first vibration generating device,
wherein the panel bottom member further comprises a second vibration transmitting member disposed to overlap with the second vibration generating device in plan view.

17. The display device of claim 16, wherein the first vibration generating device is disposed closer than the second vibration generating device to a first side of the display panel,
wherein the second vibration generating device is disposed closer than the first vibration generating device to a second side of the display panel, and
wherein the second side of the display panel is opposite to the first side of the display panel.

18. The display device of claim 17, further comprising: a blocking member disposed between the first and second vibration transmitting members distanced apart from the first and second vibration transmitting members, the blocking member configured to block vibration transmitted from the first and second vibration transmitting members.

19. A display device comprising:
a display panel;
an adhesive member disposed below the display panel;
a panel bottom member disposed below the adhesive member;
a vibration generating device disposed below the panel bottom member, the vibration generating device configured to:
receive driving voltages; and generate vibration in response to the received driving voltages;

a vibration transmitting member disposed between the vibration generating device and the display panel; and a first adhesive member disposed between the display panel and the panel bottom member, wherein the vibration transmitting member is disposed on at least a part of the adhesive member exposed by an opening formed in the panel bottom member, wherein the panel bottom member comprises a buffer member, a film layer, a shielding member, and a heat dissipation member, and wherein the buffer member, the film layer, the shielding member, and the heat dissipation member are laminated in a thickness direction.

* * * * *